(12) United States Patent
Gassend et al.

(10) Patent No.: US 11,656,358 B2
(45) Date of Patent: May 23, 2023

(54) SYNCHRONIZATION OF MULTIPLE ROTATING SENSORS OF A VEHICLE

(71) Applicant: Waymo LLC, Mountain View, CA (US)

(72) Inventors: Blaise Gassend, East Palo Alto, CA (US); Nicholas Armstrong-Crews, Mountain View, CA (US); Andreas Wendel, Mountain View, CA (US); Benjamin Ingram, Santa Clara, CA (US); Clayton Kunz, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 710 days.

(21) Appl. No.: 16/671,858

(22) Filed: Nov. 1, 2019

(65) Prior Publication Data
US 2020/0142073 A1 May 7, 2020

Related U.S. Application Data

(60) Provisional application No. 62/755,335, filed on Nov. 2, 2018.

(51) Int. Cl.
*G01S 17/89* (2020.01)
*G01S 17/10* (2020.01)
*G01S 7/481* (2006.01)

(52) U.S. Cl.
CPC ............ *G01S 17/89* (2013.01); *G01S 7/4817* (2013.01); *G01S 17/10* (2013.01)

(58) Field of Classification Search
CPC ........ G01S 17/89; G01S 7/4817; G01S 17/10; G01S 17/87; G01S 17/931
See application file for complete search history.

(56) References Cited

U.S. PATENT DOCUMENTS 9,329,269 B2   5/2016   Zeng
9,835,719 B2   12/2017  Nguyen
(Continued)

FOREIGN PATENT DOCUMENTS

KR   10-2018-0002205      1/2018
KR   10-2018-0011989      2/2018
WO      2018140656 A1     8/2018

OTHER PUBLICATIONS

The International Search Report with Written Opinion for PCT/2019/059465 dated Feb. 25, 2020, pp. 1-9.
(Continued)

*Primary Examiner* — Jonathan M Hansen
(74) *Attorney, Agent, or Firm* — McDonnell Boehnen Hulbert & Berghoff LLP

(57) ABSTRACT

One example system includes a first light detection and ranging (LIDAR) device that scans a first field-of-view defined by a first range of pointing directions associated with the first LIDAR device. The system also includes a second LIDAR device that scans a second FOV defined by a second range of pointing directions associated with the second LIDAR device. The second FOV at least partially overlaps the first FOV. The system also includes a first controller that adjusts a first pointing direction of the first LIDAR device. The system also includes a second controller that adjusts a second pointing direction of the second LIDAR device synchronously with the adjustment of the first pointing direction of the first LIDAR device.

20 Claims, 15 Drawing Sheets

(56) References Cited

U.S. PATENT DOCUMENTS

| | | | |
|---|---|---|---|
| 10,031,232 B2 | 7/2018 | Zohar et al. | |
| 10,663,595 B2* | 5/2020 | Curatu | G01S 17/87 |
| 2014/0350836 A1* | 11/2014 | Stettner | G01S 7/481 |
| | | | 356/4.01 |
| 2017/0082735 A1* | 3/2017 | Slobodyanyuk | G01S 17/42 |
| 2017/0082737 A1* | 3/2017 | Slobodyanyuk | G01S 7/497 |
| 2018/0017680 A1 | 1/2018 | Pennecot et al. | |
| 2018/0081061 A1 | 3/2018 | Mandai et al. | |
| 2018/0259626 A1 | 9/2018 | Spector | |
| 2018/0299534 A1 | 10/2018 | LaChapelle et al. | |
| 2019/0011544 A1 | 1/2019 | Gassend et al. | |
| 2020/0014525 A1* | 1/2020 | Nasr | G05D 1/021 |

OTHER PUBLICATIONS

Borgmann, Bjorn et al. "Usage of Multiple Lidar Sensors on a Mobile System for the Detection of Persons With Implicit Shape Models" The International Archives of the Photogrammetry, Remote Sensing and Spatial Information Sciences, vol. XLII-2, 2018 ISPRS TC II Mid-term Symposium "Towards Photogrammetry 2020", Jun. 4-7, 2018, Riva del Garda, Italy.

* cited by examiner

Right Side View

Front View

Back View

Top View

SYNCHRONIZATION OF MULTIPLE ROTATING SENSORS OF A VEHICLE

CROSS-REFERENCE TO RELATED APPLICATIONS

This application claims priority to U.S. Provisional Patent Application No. 62/755,335 filed on Nov. 2, 2018, the entirety of which is incorporated herein by reference. Also incorporated herein by reference is U.S. patent application Ser. No. 15/644,146, filed Jul. 7, 2017.

BACKGROUND

A vehicle can include one or more sensors that are configured to detect information about the environment in which the vehicle operates.

Active sensors, such as light detection and ranging (LIDAR) sensors, radio detection and ranging (RADAR) sensors, sound navigation and ranging (SONAR) sensors, among others, are sensors that can scan a surrounding environment by emitting signals toward the surrounding environment and detecting reflections of the emitted signals.

For example, a LIDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a system is provided. The system includes a first light detection and ranging (LIDAR) device mounted to a vehicle at a first mounting position. The first LIDAR device scans a first field-of-view defined by a first range of pointing directions associated with the first LIDAR device and the first mounting position. The system also includes a second LIDAR device mounted to the vehicle at a second mounting position. The second LIDAR device scans a second FOV defined by a second range of pointing directions associated with the second LIDAR device and the second mounting position. The second FOV at least partially overlaps the first FOV. The system also includes a first controller that adjusts a first pointing direction of the first LIDAR device. The system also includes a second controller that adjusts a second pointing direction of the second LIDAR device synchronously with the adjustment of the first pointing direction of the first LIDAR device.

In another example, a vehicle is provided. The vehicle includes a first light detection and ranging (LIDAR) device mounted to the vehicle at a first mounting position. The first LIDAR device scans a first field-of-view (FOV) associated with a first range of yaw directions of the first LIDAR device. The vehicle also includes a second LIDAR device mounted to the vehicle at a second mounting position. The second LIDAR device scans a second FOV associated with a second range of yaw directions of the second LIDAR device. The second FOV at least partially overlaps the first FOV. The vehicle also includes a first actuator that rotates the first LIDAR device to adjust a first yaw direction of the first LIDAR device. The vehicle also includes a second actuator that rotates the second LIDAR device synchronously with the rotation of the first LIDAR device to adjust a second yaw direction of the second LIDAR device.

In yet another example, a method involves scanning a first field-of-view (FOV) defined by a first range of pointing directions associated with a first light detection and ranging (LIDAR) device and a first mounting position of the first LIDAR device on a vehicle. The method also involves scanning a second FOV defined by a second range of pointing directions associated with a second LIDAR device and a second mounting position of the second LIDAR device on the vehicle. The second FOV at least partially overlaps the first FOV. The method also involves synchronously adjusting a first pointing direction of the first LIDAR device and a second pointing direction of the second LIDAR device.

In still another example, a system comprises means for scanning a first field-of-view (FOV) defined by a first range of pointing directions associated with a first light detection and ranging (LIDAR) device and a first mounting position of the first LIDAR device on a vehicle. The system further comprises means for scanning a second FOV defined by a second range of pointing directions associated with a second LIDAR device and a second mounting position of the second LIDAR device on the vehicle. The second FOV at least partially overlaps the first FOV. The system further comprises means for synchronously adjusting a first pointing direction of the first LIDAR device and a second pointing direction of the second LIDAR device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
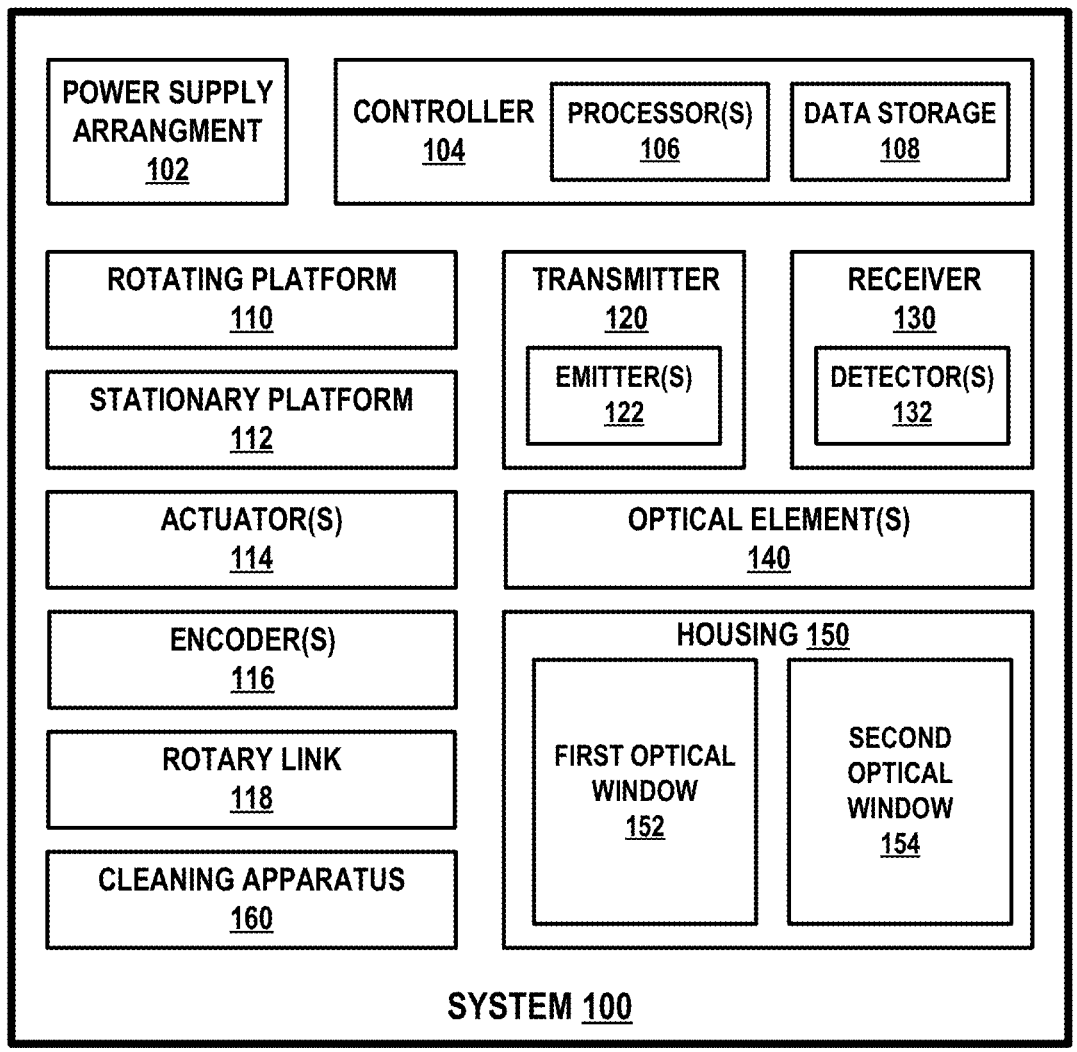
FIG. 1 is a simplified block diagram of a system, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

I. OVERVIEW

Some example implementations herein relate to combining sensor data from multiple active sensors (e.g., LIDARs, RADARs, SONARs, etc.) that have at least partially overlapping FOVs to generate a combined representation (e.g., point cloud, etc.) of a scanned environment.

In some scenarios, combining sensor data from multiple active sensors may be technically challenging. For example, consider a scenario where two LIDARs scan a particular region of an environment at different respective times. In this example, combining sensor data collected by the two LIDARs during the two respective scans may result in an incoherent appearance of the particular region (and/or adjacent regions) of the environment (e.g., due to changes in the environment, such as object movements, etc., that occur between the respective times of the two scans). Other examples are possible.

Accordingly, some example implementations herein may involve directional and temporal synchronization of multiple scanning sensors.

In one example, a system includes a first LIDAR and a second LIDAR. The first LIDAR rotates about a first yaw axis to scan a first FOV associated with a first range of yaw directions of the first LIDAR. The second LIDAR rotates about a second yaw axis (e.g., parallel to the first yaw axis) to scan a second FOV associated with a second range of yaw directions of the second LIDAR. The second FOV at least partially overlaps the first FOV. The system also includes a controller that synchronizes the rotation of the first LIDAR with the rotation of the second LIDAR.

In one implementation, the system synchronizes the rotating LIDARs by using the same reference timing signal as a basis for matching the respective yaw directions of the two rotating LIDARs at any given time. For instance, the system can use a common clock signal to synchronize the frequency, phase, and/or direction of the rotation of the LIDARs. For instance, at time t=0 seconds, both LIDARs can be pointed toward a first direction, and at time t=T1, both LIDARs may be pointed toward a second direction.

In another implementation, the system synchronizes the LIDARs by additionally or alternatively accounting for a difference between respective mounting positions of the LIDARs to align the respective yaw directions of the LIDARs toward the same region of the environment at a particular time. For instance, the system may offset the first yaw direction of the first LIDAR relative to the second yaw direction of the second LIDAR at the particular time such that both LIDARs scan a target object in the environment simultaneously at that particular time. In this way, a particular region of the environment (e.g., where respective FOVs of the LIDARs overlap) can be scanned at an approximately similar time by the respective LIDARs. This synchronization of multiple LIDARs can, for instance, facilitate the combination of data collected by the multiple LIDARs into a single point cloud (while mitigating parallax associated with the different mounting positions of the LIDARs).

Other example configurations and operations are possible. In one example, another type of sensor can be mounted to the vehicle in addition to or instead of one or more of the LIDARs. Thus, in general, some example implementations herein may involve adjusting scanning directions of one or more vehicle-mounted sensors (e.g., LIDAR, RADAR, SONAR, microwave sensor, camera, or any other sensor) according to a common timing signal and/or according to respective mounting positions of the sensors.

II. EXAMPLE SENSORS

A non-exhaustive list of example sensors of the present disclosure includes LIDAR sensors, RADAR sensors, SONAR sensors, active IR cameras, and/or microwave cameras, among others. To that end, some example sensors herein may include active sensors that emit a signal (e.g., visible light signal, invisible light signal, radio-frequency signal, microwave signal, sound signal, etc.), and then detect reflections of the emitted signal from the surrounding environment.

FIG. 1 is a simplified block diagram of a system 100, according to example embodiments. As shown, system 100 includes a power supply arrangement 102, a controller 104, a rotating platform 110, a stationary platform 112, one or more actuators 114, one or more encoders 116, a rotary link 118, a transmitter 120, a receiver 130, one or more optical elements 140, a housing 150, and a cleaning apparatus 160. In some embodiments, system 100 may include more, fewer, or different components. Additionally, the components shown may be combined or divided in any number of ways.

Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of the system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 118.

In some examples, controller 104 may include or otherwise be coupled to wiring used for transfer of control signals to various components of system 100 and/or for transfer of data from various components of system 100 to controller 104. For example, the data that controller 104 receives may include sensor data indicating detections of signals by receiver 130, among other possibilities. Moreover, the control signals sent by controller 104 may operate various components of system 100, such as by controlling emission of signals by transmitter 120, controlling detection of signals by the receiver 130, and/or controlling actuator(s) 114 to rotate rotating platform 110, among other possibilities.

As shown, controller 104 may include one or more processors 106 and data storage 108. In some examples, data storage 108 may store program instructions executable by processor(s) 106 to cause system 100 to perform the various operations described herein. To that end, processor(s) 106 may comprise one or more general-purpose processors and/or one or more special-purpose processors. To the extent that controller 104 includes more than one processor, such processors could work separately or in combination. In some examples, data storage 108 may comprise one or more volatile and/or one or more non-volatile storage components, such as optical, magnetic, and/or organic storage, and data storage 108 may be optionally integrated in whole or in part with the processor(s).

In some examples, controller 104 may communicate with an external controller or the like (e.g., a computing system arranged in a vehicle to which system 100 is mounted) so as to help facilitate transfer of control signals and/or data between the external controller and the various components of system 100. Additionally or alternatively, in some examples, controller 104 may include circuitry wired to perform one or more of the operations described herein. For example, controller 104 may include one or more pulser circuits that provide pulse timing signals for triggering emission of pulses or other signals by transmitter 120. Additionally or alternatively, in some examples, controller 104 may include one or more special purpose processors, servos, or other types of controllers. For example, controller 104 may include a proportional-integral-derivative (PID) controller or other control loop feedback mechanism that operates actuator(s) 114 to cause the rotating platform to rotate at a particular frequency or phase. Other examples are possible as well.

Rotating platform 110 may be configured to rotate about an axis. To that end, rotating platform 110 can be formed from any solid material suitable for supporting one or more components mounted thereon. For example, transmitter 120 and receiver 130 may be arranged on rotating platform 110 such that each of these components moves relative to the environment based on rotation of rotating platform 110. In particular, these components could be rotated about an axis so that system 100 may obtain information from various directions. For instance, where the axis of rotation is a vertical axis, a pointing direction of system 100 can be adjusted horizontally by actuating the rotating platform 110 about the vertical axis.

Stationary platform 112 may take on any shape or form and may be configured for coupling to various structures, such as to a top of a vehicle, a robotic platform, assembly line machine, or any other system that employs system 100 to scan its surrounding environment, for example. Also, the coupling of the stationary platform may be carried out via any feasible connector arrangement (e.g., bolts, screws, etc.).

Actuator(s) 114 may include motors, pneumatic actuators, hydraulic pistons, and/or piezoelectric actuators, and/or any other types of actuators. In one example, actuator(s) 114 may include a first actuator configured to actuate the rotating platform 110 about the axis of rotation of rotating platform 110. In another example, actuator(s) 114 may include a second actuator configured to rotate one or more components of system 100 about a different axis of rotation. For instance, the second actuator may rotate an optical element (e.g., mirror, etc.) about a second axis (e.g., horizontal axis, etc.) to adjust a direction of an emitted light pulse (e.g., vertically, etc.). In yet another example, actuator(s) 114 may include a third actuator configured to tilt (or otherwise move) one or more components of system 100. For instance, the third actuator can be used to move or replace a filter or other type of optical element 140 along an optical path of an emitted light pulse, or can be used to tilt rotating platform (e.g., to adjust the extents of a field-of-view (FOV) scanned by system 100, etc.), among other possibilities.

Encoder(s) 116 may include any type of encoder (e.g., mechanical encoders, optical encoders, magnetic encoders, capacitive encoders, etc.). In general, encoder(s) 116 may be configured to provide rotational position measurements of a device that rotates about an axis. In one example, encoder(s) 116 may include a first encoder coupled to rotating platform 110 to measure rotational positions of platform 110 about an axis of rotation of platform 110. In another example, encoder(s) 116 may include a second encoder coupled to a mirror (or other optical element 140) to measure rotational positions of the mirror about an axis of rotation of the mirror.

Rotary link 118 directly or indirectly couples stationary platform 112 to rotating platform 110. To that end, rotary link 118 may take on any shape, form and material that provides for rotation of rotating platform 110 about an axis relative to the stationary platform 112. For instance, rotary link 118 may take the form of a shaft or the like that rotates based on actuation from actuator(s) 114, thereby transferring mechanical forces from actuator(s) 114 to rotating platform 110. In one implementation, rotary link 118 may have a central cavity in which one or more components of system 100 may be disposed. In some examples, rotary link 118 may also provide a communication link for transferring data and/or instructions between stationary platform 112 and rotating platform 110 (and/or components thereon such as transmitter 120 and receiver 130).

Transmitter 120 may be configured to transmit signals toward an environment of system 100. As shown, transmitter 120 may include one or more emitters 122. Emitters 122 may include various types of emitters depending on a configuration of system 100.

In a first example, where system 100 is configured as a LIDAR device, transmitter 120 may include one or more light emitters 122 that emit one or more light beams and/or pulses having wavelengths within a wavelength range. The wavelength range could be, for example, in the ultraviolet, visible, and/or infrared portions of the electromagnetic spectrum. In some examples, the wavelength range can be a narrow wavelength range, such as that provided by lasers. A non-exhaustive list of example light emitters 122 includes laser diodes, diode bars, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), fiber lasers, and/or any other device configured to selectively transmit, reflect, and/or emit light to provide a plurality of emitted light beams and/or pulses.

In a second example, where system 100 is configured as an active infrared (IR) camera, transmitter 120 may include one or more emitters 122 configured to emit IR radiation to illuminate a scene. To that end, transmitter 120 may include any type of emitter (e.g., light source, etc.) configured to provide the IR radiation.

In a third example, where system 100 is configured as a RADAR device, transmitter 120 may include one or more antennas, waveguides, and/or other type of RADAR signal emitters 122, that are configured to emit and/or direct modulated radio-frequency (RF) signals toward an environment of system 100.

In a fourth example, where system 100 is configured as a SONAR device, transmitter 120 may include one or more acoustic transducers, such as piezoelectric transducers, magnetostrictive transducers, electrostatic transducers, and/or other types of SONAR signal emitters 122, that are configured to emit a modulated sound signal toward an environment of system 100. In some implementations, the acoustic transducers can be configured to emit sound signals within a particular wavelength range (e.g., infrasonic, ultrasonic, etc.). Other examples are possible as well.

In some implementations, system 100 (and/or transmitter 120) can be configured to emit a plurality of signals (e.g., light beams, IR signals, RF waves, sound waves, etc.) in a relative spatial arrangement that defines a FOV of system 100. For example, each beam (or signal) may be configured to propagate toward a portion of the FOV. In this example, multiple adjacent (and/or partially overlapping) beams may be directed to scan multiple respective portions of the FOV during a scan operation performed by system 100. Other examples are possible as well.

Receiver 130 may include one or more detectors 132 configured to detect reflections of the signals emitted by transmitter 120.

In a first example, where system 100 is configured as a RADAR device, receiver 130 may include one or more antennas (i.e., detectors 132) configured to detect reflections of the RF signal transmitted by transmitter 120. To that end, in some implementations, the one or more antennas of transmitter 120 and receiver 130 can be physically implemented as the same physical antenna structures.

In a second example, where system 100 is configured as a SONAR device, receiver 130 may include one or more sound sensors 110 (e.g., microphones, etc.) that are configured to detect reflections of the sound signals emitted by transmitter 120.

In a third example, where system 100 is configured as an active IR camera, receiver 130 may include one or more light detectors 132 (e.g., charge-coupled devices (CCDs), etc.) that are configured to detect a source wavelength of IR light transmitted by transmitter 120 and reflected off a scene toward receiver 130.

In a fourth example, where system 100 is configured as a LIDAR device, receiver 130 may include one or more light detectors 132 arranged to intercept and detect reflections of the light pulses or beams emitted by transmitter 120 that return to system 100 from the environment. Example light detectors 132 may include photodiodes, avalanche photodiodes (APDs), silicon photomultipliers (SiPMs), single photon avalanche diodes (SPADs), multi-pixel photon counters (MPPCs), phototransistors, cameras, active pixel sensors (APS), charge coupled devices (CCD), cryogenic detectors, and/or any other sensor of light. In some instances, receiver 130 may be configured to detect light having wavelengths in the same wavelength range as the light emitted by transmitter 120. In this way, for instance, system 100 may distinguish received light originated by system 100 from other light originated by external sources in the environment.

In some implementations, receiver 130 may include a detector comprising an array of sensing elements connected to one another. For instance, where system 100 is configured as a LIDAR device, multiple light sensing elements could be connected in parallel to provide a photodetector array having a larger light detection area (e.g., combination of the sensing surfaces of the individual detectors in the array, etc.) than a detection area of a single sensing element. The photodetector array could be arranged in a variety ways. For instance, the individual detectors of the array can be disposed on one or more substrates (e.g., printed circuit boards (PCBs), flexible PCBs, etc.) and arranged to detect incoming light that is traveling along an optical path of an optical lens of system 100 (e.g., optical element(s) 140). Also, such a photodetector array could include any feasible number of detectors arranged in any feasible manner.

In some examples, system 100 can select or adjust a horizontal scanning resolution by changing a rate of rotation of system 100 (and/or transmitter 120 and receiver 130). Additionally or alternatively, the horizontal scanning resolution can be modified by adjusting a pulse rate of signals emitted by transmitter 120. In a first example, transmitter 120 may be configured to emit pulses at a pulse rate of 15,650 pulses per second, and to rotate at 10 Hz (i.e., ten complete 360° rotations per second) while emitting the pulses. In this example, receiver 130 may have a 0.23° horizontal angular resolution (e.g., horizontal angular separation between consecutive pulses). In a second example, if system 100 is instead rotated at 20 Hz while maintaining the pulse rate of 15,650 pulses per second, then the horizontal angular resolution may become 0.46°. In a third example, if transmitter 120 emits the pulses at a rate of 31,300 pulses per second while maintaining the rate of rotation of 10 Hz, then the horizontal angular resolution may become 0.115°. In some examples, system 100 can be alternatively configured to scan a particular range of views within less than a complete 360° rotation of system 100. Other implementations are possible as well.

It is noted that the pulse rates, angular resolutions, rates of rotation, and viewing ranges described above are only for the sake of example, and thus each of these scanning characteristics could vary according to various applications of system 100.

Optical element(s) 140 can be optionally included in or otherwise coupled to transmitter 120 and/or receiver 130. In one example, optical element(s) 140 can be arranged to direct light emitted by emitter(s) 122 toward a scene (or a region therein). In another example, optical element(s) 140 can be arranged to focus light from the scene (or a region therein) toward detector(s) 132. As such, optical element(s) 140 may include any feasible combination of optical elements, such as filters, apertures, mirror(s), waveguide(s), lens(es), or other types optical components, that are arranged to guide propagation of light through physical space and/or to adjust a characteristic of the light.

In some examples, controller 104 could operate actuator 114 to rotate rotating platform 110 in various ways so as to obtain information about the environment. In one example, rotating platform 110 could be rotated in either direction. In another example, rotating platform 110 may carry out complete revolutions such that system 100 scans a 360° view of the environment. Moreover, rotating platform 110 could rotate at various frequencies so as to cause system 100 to scan the environment at various refresh rates. In one embodiment, system 100 may be configured to have a refresh rate of 3-30 Hz, such as 10 Hz (e.g., ten complete rotations of system 100 per second). Other refresh rates are possible.

Alternatively or additionally, system 100 may be configured to adjust the pointing direction of an emitted signal (emitted by transmitter 120) in various ways. In one implementation, signal emitters (e.g., light sources, antennas, acoustic transducers, etc.) of transmitter 120 can be operated according to a phased array configuration or other type of beam steering configuration.

In a first example, where system 100 is configured as a LIDAR device, light sources or emitters in transmitter 120 can be coupled to phased array optics that control the phase of light waves emitted by the light sources. For instance, controller 104 can be configured to adjust the phased array optics (e.g., phased array beam steering) to change the effective pointing direction of a light signal emitted by transmitter 120 (e.g., even if rotating platform 110 is not rotating).

In a second example, where system 100 is configured as a RADAR device, transmitter 120 may include an array of antennas, and controller 104 can provide respective phase-shifted control signals for each individual antenna in the array to modify a pointing direction of a combined RF signal from the array (e.g., phased array beam steering).

In a third example, where system 100 is configured as a SONAR device, transmitter 120 may include an array of acoustic transducers, and controller 104 can similarly operate the array of acoustic transducers (e.g., via phase-shifted control signals, phased array beam steering, etc.) to achieve a target pointing direction of a combined sound signal emitted by the array (e.g., even if rotating platform 110 is not rotating, etc.).

Housing 150 may take on any shape, form, and material and may be configured to house one or more components of system 100. In one example, housing 150 can be a dome-shaped housing. Further, in some examples, housing 150 may be composed of or may include a material that is at least partially non-transparent, which may allow for blocking of at least some signals from entering the interior space of the housing 150 and thus help mitigate thermal and noise effects of ambient signals on one or more components of system 100. Other configurations of housing 150 are possible as well.

In some examples, housing 150 may be coupled to rotating platform 110 such that housing 150 is configured to rotate based on rotation of rotating platform 110. In these examples, transmitter 120, receiver 130, and possibly other components of system 100 may each be disposed within housing 150. In this manner, transmitter 120 and receiver 130 may rotate along with housing 150 while being disposed within housing 150. In other examples, housing 150 may be coupled to stationary platform 112 or other structure such that housing 150 does not rotate with the other components rotated by rotating platform 110.

As shown, housing 150 can optionally include a first optical window 152 and a second optical window 154. Thus, in some examples, housing 150 may define an optical cavity in which one or more components disposed inside the housing (e.g., transmitter 120, receiver 130, etc.) are optically isolated from external light in the environment, except for light that propagates through optical windows 152 and 154. With this arrangement for instance, system 100 (e.g., in a LIDAR configuration, etc.) may reduce interference from external light (e.g., noise, etc.) with signals transmitted by transmitter 120 and/or reflections of the transmitted signal received by receiver 130.

To that end, in some embodiments, optical windows 152 and 154 may include a material that is transparent to the wavelengths of light emitted by emitters 122 and/or one or more other wavelengths. For example, each of optical windows 152 and 154 may be formed from a glass substrate or a plastic substrate, among others. Additionally, in some examples, each of optical windows 152 and 154 may include or may be coupled to a filter that selectively transmits wavelengths of light transmitted by emitter(s) 122, while reducing transmission of other wavelengths. Optical windows 152 and 154 may have various thicknesses. In one embodiment, optical windows 152 and 154 may have a thickness between 1 millimeter and 2 millimeters. Other thicknesses are possible as well.

In some examples, second optical window 154 may be located at an opposite side of housing 150 from first optical window 152.

Cleaning apparatus 160 can be optionally included in system 100 to facilitate cleaning one or more components (e.g., optical element(s) 140, etc.) of system 100. To that end, cleaning apparatus 160 may include one or more cleaning mechanisms. In a first example, cleaning apparatus 160 may include a liquid spray configured to deposit liquid on one or more components of system 100 (e.g., optical element(s) 140, housing 150, etc.). For instance, the liquid can be applied to attempt dissolving or mechanically removing an occlusion (e.g., dirt, dust, etc.) disposed on a surface of an optical component. In a second example, cleaning apparatus 160 may include a high-pressure gas pump configured to apply gas onto an occlusion on a surface of an optical component. In a third example, cleaning apparatus 10 may include a wiper (e.g., similar to a windshield wiper) configured to attempt removing an occlusion from a surface of a component in system 100. Other examples are possible.

It is noted that this arrangement of system 100 is described for exemplary purposes only and is not meant to be limiting. As noted above, in some examples, system 100 can be alternatively implemented with fewer components than those shown. In one example, system 100 can be implemented without rotating platform 100. For instance, transmitter 120 can be configured to transmit a plurality of signals spatially arranged to define a particular FOV of system 100 (e.g., horizontally and vertically) without necessarily rotating transmitter 120 and receiver 130. Other examples are possible as well.

Figure 2A:
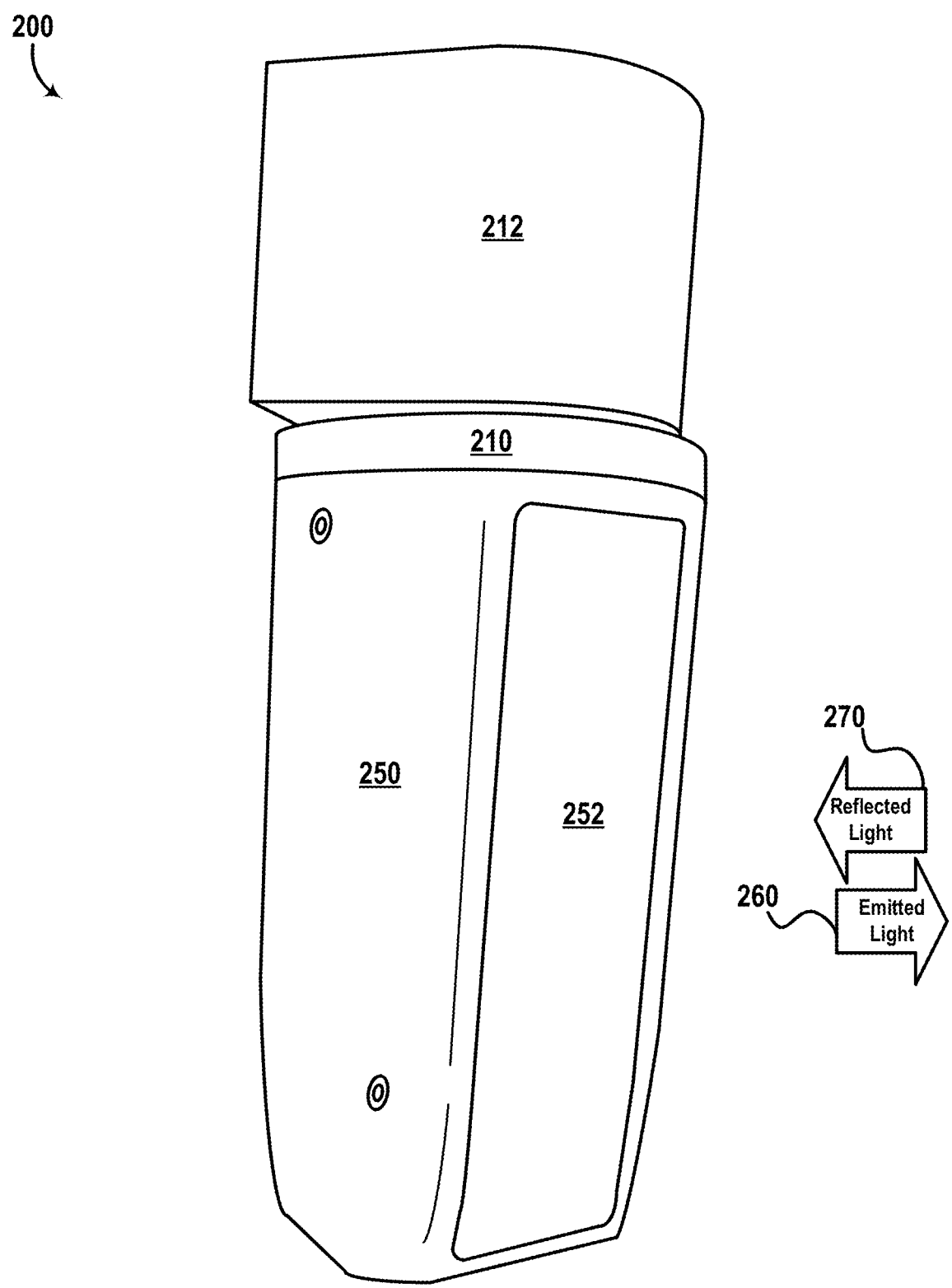
FIG. 2A illustrates a LIDAR device, according to example embodiments.

FIG. 2A illustrates a LIDAR device 200, according to example embodiments. As shown, LIDAR 200 includes a rotating platform 210, a stationary platform 212, and a housing 250 that are similar, respectively, to rotating platform 110, stationary platform 112, and housing 150 of system 100.

LIDAR 200 may be configured to scan an environment by emitting light 260 toward the environment, and detecting reflect portions (e.g., reflected light 270) of the emitted light returning to LIDAR 200 from the environment. Further, to adjust a FOV scanned by LIDAR 200 (i.e., the region illuminated by emitted light 260), rotating platform 210 may be configured to rotate housing 250 (and one or more components included therein) about an axis of rotation of rotating platform 210. For instance, where the axis of rotation of platform 210 is a vertical axis, rotating platform 210 may adjust the direction of emitted light 260 horizontally to define the horizontal extents of the FOV of LIDAR 200.

As shown, LIDAR 200 also includes an optical window 252 through which emitted light 260 is transmitted out of housing 250, and through which reflected light 270 enters into housing 250. Although not shown, housing 250 may also include another optical window located at an opposite side of housing 250 from optical window 252. Thus, housing 250 may define an optical cavity in which one or more components disposed inside the housing (e.g., transmitter, receiver, etc.) are optically isolated from external light in the environment, except for light that propagates through one or more optical windows. With this arrangement for instance, LIDAR 200 may reduce interference from external light (e.g., noise, etc.) with transmitted signals 260 and/or reflected signals 270.

To that end, in some embodiments, optical window 252 may include a material that is transparent to the wavelengths of emitted light 270 and/or one or more other wavelengths. For example, optical window 252 may be formed from a glass substrate or a plastic substrate, among others. Additionally, in some examples, optical window 252 may include or may be coupled to a filter that selectively transmits wavelengths of emitted light 260, while reducing transmission of other wavelengths through the optical window 252. Optical window 252 may have various thicknesses. In one embodiment, optical window 252 may have a thickness between 1 millimeter and 2 millimeters. Other thicknesses are possible.

Figure 2B:
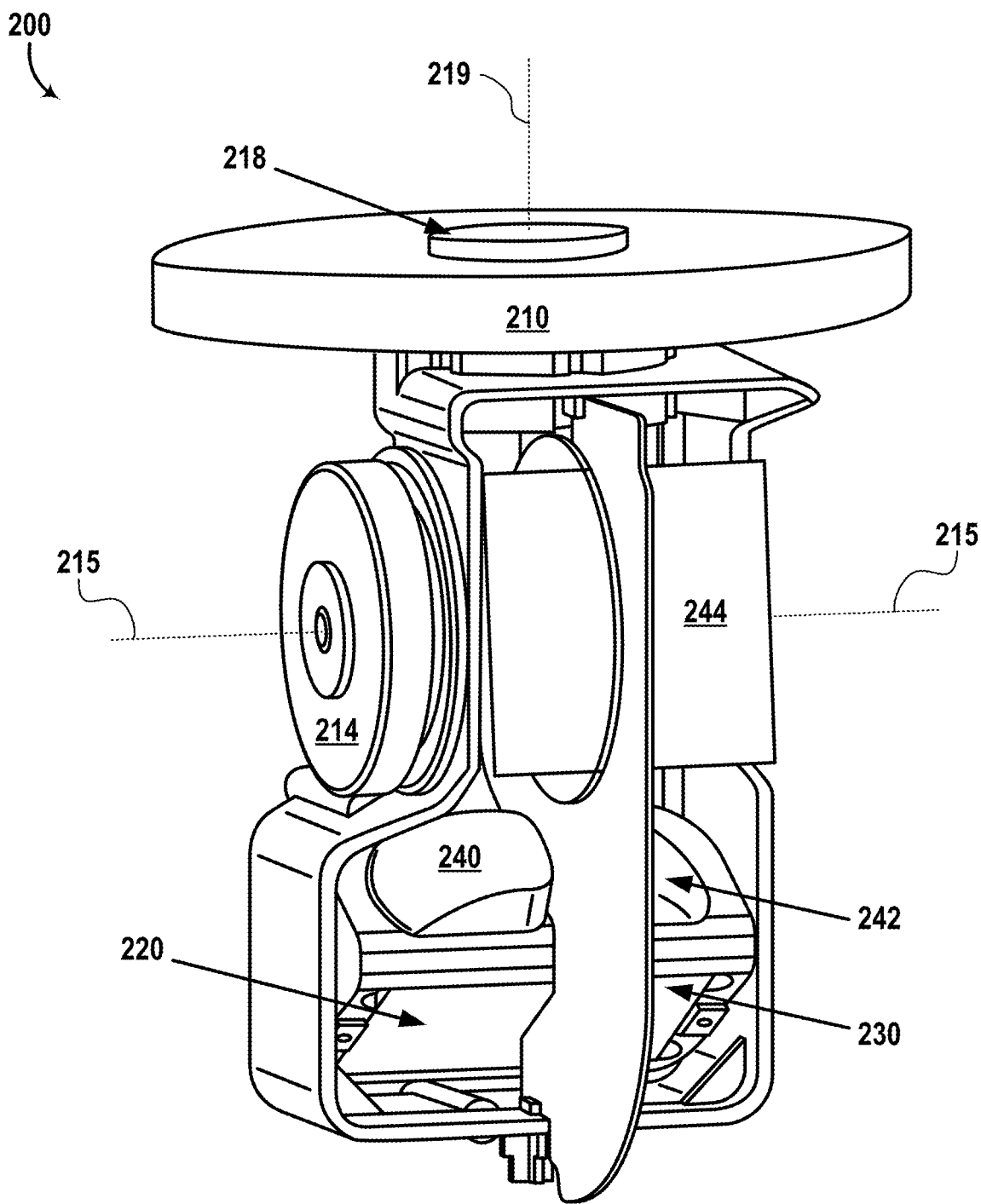
FIG. 2B illustrates a partial perspective view of the LIDAR device.

FIG. 2B illustrates a partial cross-section view of LIDAR 200. It is noted that some of the components of LIDAR 200 (e.g., platform 212, housing 250, and optical window 252) are omitted from the illustration of FIG. 2B for convenience in description.

As shown in FIG. 2B, LIDAR device 200 also includes actuators 214 and 218, which may be similar to actuators 114 of system 100. Additionally, as shown, LIDAR 200 includes a transmitter 220 and a receiver 230, which may be similar, respectively, to transmitter 120 and receiver 130 of system 100. Additionally, as shown, LIDAR 200 includes one or more optical elements (i.e., a transmit lens 240, a receive lens 242, and a mirror 244), which may be similar to optical elements 140 of system 100.

Actuators 214 and 218 may include a stepper motor, an electric motor, a combustion motor, a pancake motor, a piezoelectric actuator, or any other type of actuator, such as those describe for actuators 114 of system 100.

As shown, actuator 214 may be configured to rotate the mirror 244 about a first axis 215, and actuator 218 may be configured to rotate rotating platform 210 about a second axis 219. In some embodiments, axis 215 may correspond to a horizontal axis of LIDAR 200 and axis 219 may correspond to a vertical axis of LIDAR 200 (e.g., axes 215 and 219 may be aligned substantially perpendicular to one another).

In an example operation, LIDAR transmitter 220 may emit light (via transmit lens 240) that reflects off mirror 244 to propagate away from LIDAR 200 (e.g., as emitted light 260 shown in FIG. 2A). Further, received light from the environment of LIDAR 200 (including light 270 shown in FIG. 2A) may be reflected off mirror 244 toward LIDAR receiver 230 (via lens 242). Thus, for instance, a vertical scanning direction of LIDAR 200 can be controlled by rotating mirror 244 (e.g., about a horizontal axis 215), and a horizontal scanning direction of LIDAR 200 can be controlled by rotating LIDAR 200 about a vertical axis (e.g., axis 219) using rotating platform 210.

In this example, mirror 244 could be rotated while transmitter 220 is emitting a series of light pulses toward the mirror. Thus, depending on the rotational position of the mirror about axis 215, each light pulse could thus be steered (e.g., vertically). As such, LIDAR 200 may scan a vertical FOV defined by a range of (vertical) steering directions provided by mirror 244 (e.g., based on a range of angular positions of mirror 244 about axis 215). In some examples, LIDAR 200 may be configured to rotate mirror 244 one or more complete rotations to steer emitted light from transmitter 220 (vertically). In other examples, LIDAR device 200 may be configured to rotate mirror 244 within a given range of angles to steer the emitted light over a particular range of directions (vertically). Thus, LIDAR 200 may scan a variety of vertical FOVs by adjusting the rotation of mirror 244. In one embodiment, the vertical FOV of LIDAR 200 is 110°. In another embodiment, the vertical FOV of LIDAR 200 IS 95°.

Continuing with this example, platform 210 may be configured to rotate the arrangement of components supported thereon (e.g., mirror 244, motor 214, lenses 230 and 232, transmitter 220, and receiver 230) about a vertical axis (e.g., axis 219). Thus, LIDAR 200 may rotate platform 210 to steer emitted light (from transmitter 220) horizontally (e.g., about the axis of rotation 219 of platform 210). Additionally, the range of the rotational positions of platform 210 (about axis 219) can be controlled to define a horizontal FOV of LIDAR 200. In one embodiment, platform 210 may rotate within a defined range of angles (e.g., 270°, etc.) to provide a horizontal FOV that is less than 360°. However, other amounts of rotation are possible as well (e.g., 360°, 8°, etc.) to scan any horizontal FOV.

Figure 2C:
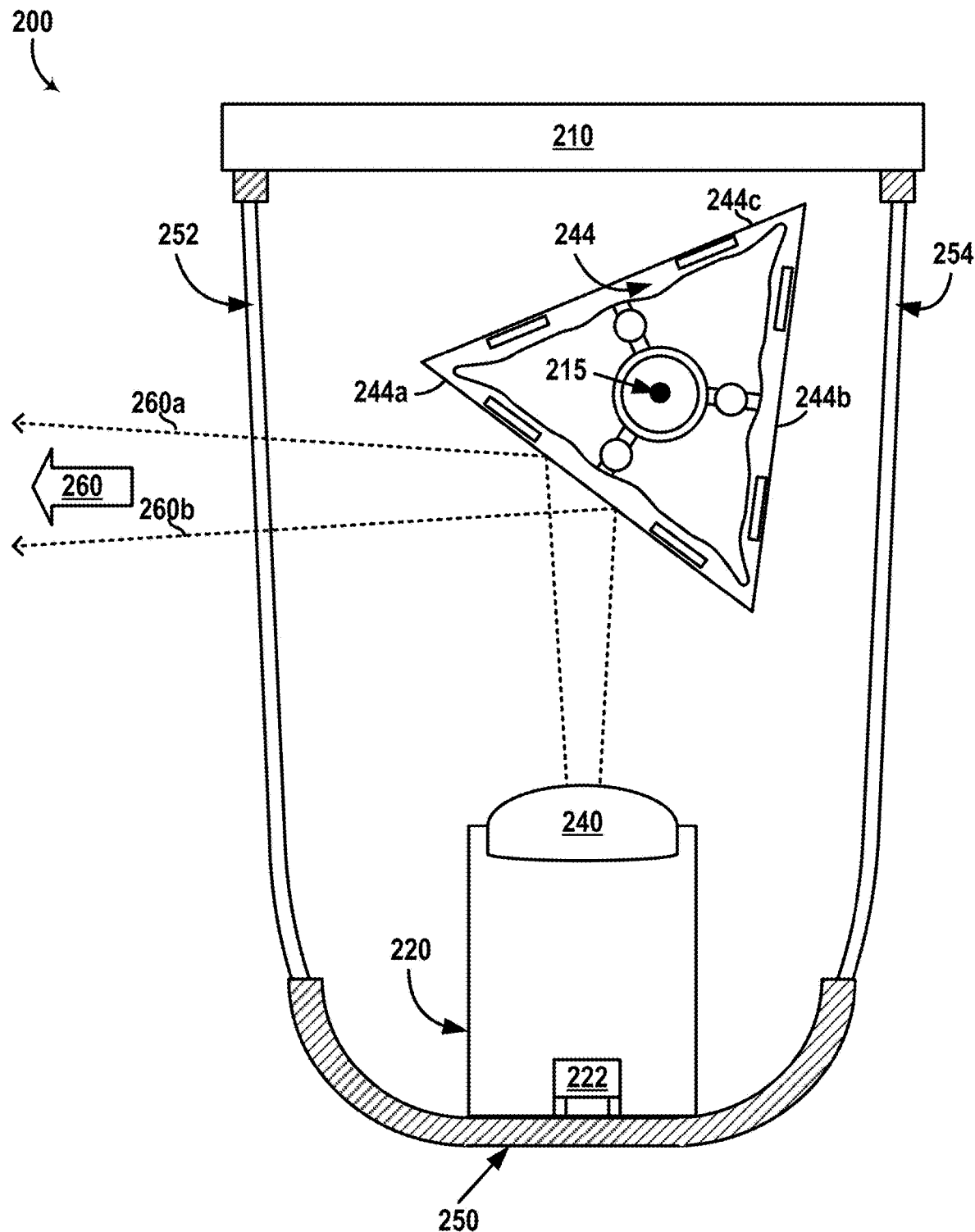
FIG. 2C illustrates a partial cross-section view of the LIDAR device.

FIG. 2C illustrates a partial cross-section view of LIDAR device 200. It is noted that some of the components of LIDAR 200 are omitted from the illustration of FIG. 2C for convenience in description. In the cross-section view of FIG. 2C, axis 215 may be perpendicular to (and may extend through) the page.

As shown in FIG. 2C, LIDAR 200 also includes a second optical window 254 that is positioned opposite to optical window 252. Optical window 254 may be similar to optical window 252. For example, optical window 254 may be configured to transmit light into and/or out of the optical cavity defined by housing 250.

As shown in FIG. 2C, transmitter 220 includes an emitter 222, which may include any of the light sources described for emitter(s) 122, for instance. In alternative embodiments, transmitter 220 may include more than one light source. Emitter 222 may be configured to emit one or more light pulses 260 (e.g., laser beams, etc.). Transmit lens 240 may be configured to direct (and/or collimate) the emitted light from emitter 222 toward mirror 244. For example, transmit lens 240 may collimate the light from the emitter to define a beam width of the light beam 260 transmitted out of LIDAR 200 (e.g., the beam divergence angle between dotted lines 260a and 260b).

As shown in FIG. 2C, mirror 244 may include three reflective surfaces 244a, 244b, 244c (e.g., triangular mirror). In alternative examples, mirror 244 may instead include additional or fewer reflective surfaces. In the example shown, the emitted light transmitted through transmit lens 240 may then reflect off reflective surface 244a toward the environment of LIDAR 200 in the direction illustrated by arrow 260. Thus, in this example, as mirror 244 is rotated (e.g., about axis 215), emitted light 260 may be steered to have a different direction (e.g., pitch direction, etc.) than that illustrated by arrow 260. For example, the direction 260 of the emitted light could be adjusted based on the rotational position of triangular mirror 244.

Additionally, in some examples, emitted light 260 may be steered out of housing 250 through optical window 252 or through optical window 254 depending on the rotational position of mirror 244 about axis 215. Thus, in some examples, LIDAR 200 may be configured to steer emitted light beam 260 within a wide range of directions (e.g., vertically), and/or out of either side of housing 250 (e.g., the sides where optical windows 252 and 252 are located).

Figure 2D:
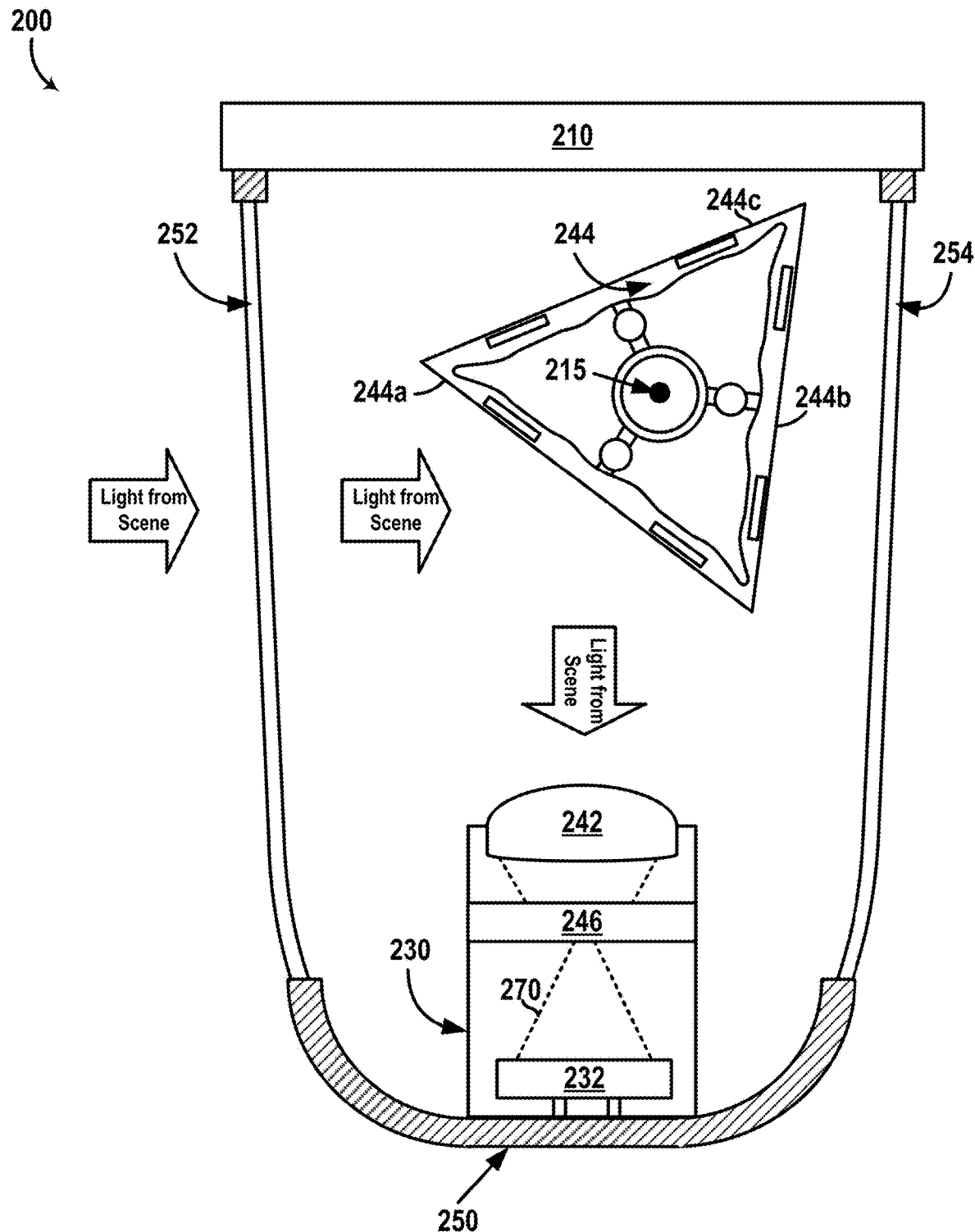
FIG. 2D illustrates another partial cross-section view of the LIDAR device.

FIG. 2D illustrates another partial cross-section view of LIDAR device 200. It is noted that some of the components of LIDAR 200 are omitted from the illustration of FIG. 2D for convenience in description. As shown, receiver 230 includes one or more light detectors 232, which may be similar to detector(s) 112 of system 100. Further, as shown, receiver 230 includes a diaphragm 246 between receive lens 246 and detector(s) 232.

Diaphragm 246 may include one or more optical elements (e.g., aperture stop, filter, etc.) configured to select a portion the light focused by receive lens 242 for transmission toward detector(s) 232.

For example, receive lens 242 may be configured to focus light received from the scene scanned by LIDAR 200 (e.g., light from the scene that enters window 252 or window 254 and is reflected by mirror 244) toward diaphragm 246. In line with the discussion above, detector(s) 232 may be arranged (or aligned) to intercept a portion of the focused light that includes light from the target region illuminated by transmitter 220. To facilitate this, for example, diaphragm 246 may include an aperture positioned and/or sized to transmit the portion of the focused light associated with the target region through the aperture as diverging light (e.g., including reflected light 270) for detection by detector(s) 232.

It is noted that the various positions, shapes, and sizes of the various components of LIDAR 200 as well the light beams emitted (or received) by LIDAR 200 may vary and are not necessarily to scale, but are illustrated as shown in FIGS. 2A-2D for convenience in description. Additionally, it is noted that LIDAR 200 may alternatively include additional, fewer, or different components than those shown in FIGS. 2A-2D.

Figure 3:
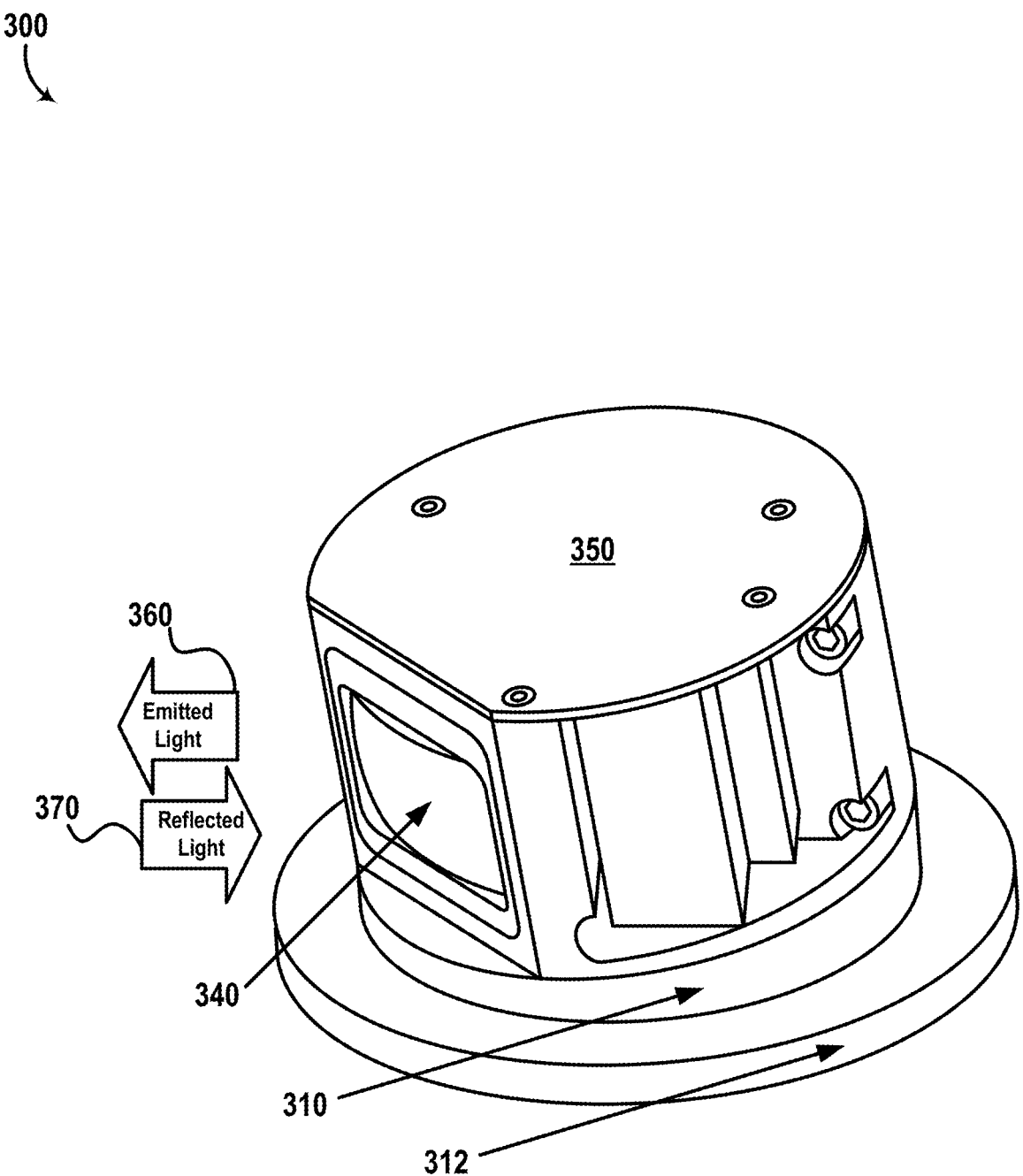
FIG. 3 illustrates another LIDAR device, according to example embodiments.

FIG. 3 illustrates another LIDAR device 300, according to an example embodiment. In some examples, LIDAR 300 may be similar to system 100. For example, as shown, LIDAR device 300 includes a lens 340 which may be similar to optical element 140 and/or optical windows 152, 154. As shown, LIDAR 300 also includes a rotating platform 310, a stationary platform 312, and a housing 350 which may be similar, respectively, to rotating platform 110, stationary platform 112, and housing 150. Additionally, as shown, light beams 360 emitted by LIDAR device 300 propagate from lens 340 along a pointing direction of LIDAR 300 toward an environment of LIDAR device 300, and reflect off one or more objects in the environment as reflected light 370.

In some examples, housing 350 can be configured to have a substantially cylindrical shape and to rotate about an axis of LIDAR device 300. In one example, housing 350 can have a diameter of approximately 10 centimeters. Other examples are possible. In some examples, the axis of rotation of LIDAR device 300 is substantially vertical (e.g., yaw axis). For instance, by rotating housing 350 that includes the various components a three-dimensional map of a 360-degree view of the environment of LIDAR device 300 can be determined. Additionally or alternatively, in some examples, LIDAR device 300 can be configured to tilt the axis of rotation of housing 350 to control a field of view of LIDAR device 300. Thus, in some examples, rotating platform 310 may comprise a movable platform that may tilt in one or more directions to change the axis of rotation of LIDAR device 300.

In some examples, lens 340 can have an optical power to both collimate the emitted light beams 360, and focus the reflected light 370 from one or more objects in the environment of LIDAR device 300 onto detectors in LIDAR device 300. In one example, lens 340 has a focal length of approximately 120 mm. Other example focal lengths are possible. By using the same lens 340 to perform both of these functions, instead of a transmit lens for collimating and a receive lens for focusing, advantages with respect to size, cost, and/or complexity can be provided. Alternatively, LIDAR 300 may include separate transmit and receive lenses.

III. EXAMPLE VEHICLES

Some example implementations herein involve a sensor, such as devices 100 and 300 for instance or another type of sensor (e.g., RADAR, SONAR, camera, another type of active sensor, etc.), mounted to a vehicle. However, an example sensor disclosed herein can also be used for various other purposes and may be incorporated on or otherwise connected to any feasible system or arrangement. For instance, an example LIDAR device can be used in an assembly line setting to monitor objects (e.g., products) being manufactured in the assembly line. Other examples are possible as well. Additionally, although illustrative embodiments herein include a LIDAR device mounted on a car, an example LIDAR device may additionally or alternatively be used on any type of vehicle, including conventional automobiles as well as automobiles having an autonomous or semi-autonomous mode of operation. Further, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, etc.

Figure 4:
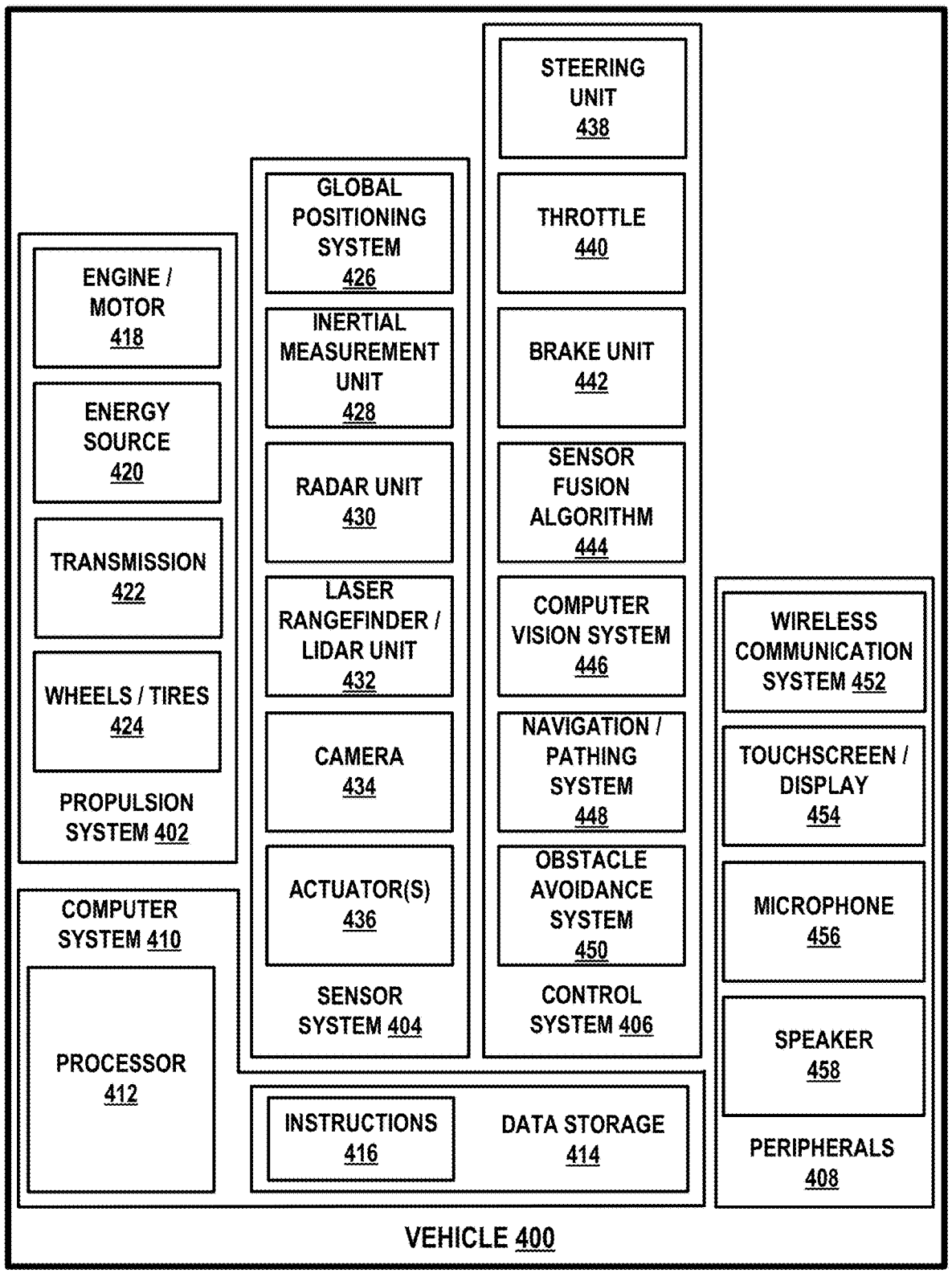
FIG. 4 is a simplified block diagram of a vehicle, according to an example embodiment.

FIG. 4 is a simplified block diagram of a vehicle 400, according to an example embodiment. As shown, the vehicle 400 includes a propulsion system 402, a sensor system 404, a control system 406, peripherals 408, and a computer system 410. In some embodiments, vehicle 400 may include more, fewer, or different systems, and each system may include more, fewer, or different components. Additionally, the systems and components shown may be combined or divided in any number of ways. For instance, control system 406 and computer system 410 may be combined into a single system.

Propulsion system 402 may be configured to provide powered motion for the vehicle 400. To that end, as shown, propulsion system 402 includes an engine/motor 418, an energy source 420, a transmission 422, and wheels/tires 424.

The engine/motor 418 may be or include any combination of an internal combustion engine, an electric motor, a steam engine, and a Sterling engine. Other motors and engines are possible as well. In some embodiments, propulsion system 402 may include multiple types of engines and/or motors. For instance, a gas-electric hybrid car may include a gasoline engine and an electric motor. Other examples are possible.

Energy source 420 may be a source of energy that powers the engine/motor 418 in full or in part. That is, engine/motor 418 may be configured to convert energy source 420 into mechanical energy. Examples of energy sources 420 include gasoline, diesel, propane, other compressed gas-based fuels, ethanol, solar panels, batteries, and other sources of electrical power. Energy source(s) 420 may additionally or alternatively include any combination of fuel tanks, batteries, capacitors, and/or flywheels. In some embodiments, energy source 420 may provide energy for other systems of the vehicle 400 as well. To that end, energy source 420 may additionally or alternatively include, for example, a rechargeable lithium-ion or lead-acid battery. In some embodiments, energy source 420 may include one or more banks of batteries configured to provide the electrical power to the various components of vehicle 400.

Transmission 422 may be configured to transmit mechanical power from the engine/motor 418 to the wheels/tires 424. To that end, transmission 422 may include a gearbox, clutch, differential, drive shafts, and/or other elements. In embodiments where the transmission 422 includes drive shafts, the drive shafts may include one or more axles that are configured to be coupled to the wheels/tires 424.

Wheels/tires 424 of vehicle 400 may be configured in various formats, including a unicycle, bicycle/motorcycle, tricycle, or car/truck four-wheel format. Other wheel/tire formats are possible as well, such as those including six or more wheels. In any case, wheels/tires 424 may be configured to rotate differentially with respect to other wheels/tires 424. In some embodiments, wheels/tires 424 may include at least one wheel that is fixedly attached to the transmission 422 and at least one tire coupled to a rim of the wheel that could make contact with the driving surface. Wheels/tires 424 may include any combination of metal and rubber, or combination of other materials. Propulsion system 402 may additionally or alternatively include components other than those shown.

Sensor system 404 may include a number of sensors configured to sense information about an environment in which the vehicle 400 is located, as well as one or more actuators 436 configured to modify a position and/or orientation of the sensors. As shown, sensor system 404 includes a Global Positioning System (GPS) 426, an inertial measurement unit (IMU) 428, a RADAR unit 430, a laser rangefinder and/or LIDAR unit 432, and a camera 434. Sensor system 404 may include additional sensors as well, including, for example, sensors that monitor internal systems of the vehicle 400 (e.g., an $O_2$ monitor, a fuel gauge, an engine oil temperature, etc.). Other sensors are possible as well.

GPS 426 may be any sensor (e.g., location sensor) configured to estimate a geographic location of vehicle 400. To this end, the GPS 426 may include a transceiver configured to estimate a position of the vehicle 400 with respect to the Earth.

IMU 428 may be any combination of sensors configured to sense position and orientation changes of the vehicle 400 based on inertial acceleration. In some embodiments, the combination of sensors may include, for example, accelerometers, gyroscopes, compasses, etc.

RADAR unit 430 may be any sensor configured to sense objects in the environment in which the vehicle 400 is located using radio signals. In some embodiments, in addition to sensing the objects, RADAR unit 430 may additionally be configured to sense the speed and/or heading of the objects.

Similarly, laser range finder or LIDAR unit 432 may be any sensor configured to sense objects in the environment in which vehicle 400 is located using lasers. For example, LIDAR unit 432 may include one or more LIDAR devices, at least some of which may take the form of system 100 and/or devices 200, 300, among other possible LIDAR configurations.

Camera 434 may be any camera (e.g., a still camera, a video camera, etc.) configured to capture images of the environment in which the vehicle 400 is located. To that end, camera 434 may take any of the forms described above.

Control system 406 may be configured to control one or more operations of vehicle 400 and/or components thereof.

To that end, control system 406 may include a steering unit 438, a throttle 440, a brake unit 442, a sensor fusion algorithm 444, a computer vision system 446, navigation or pathing system 448, and an obstacle avoidance system 450.

Steering unit 438 may be any combination of mechanisms configured to adjust the heading of vehicle 400. Throttle 440 may be any combination of mechanisms configured to control engine/motor 418 and, in turn, the speed of vehicle 400. Brake unit 442 may be any combination of mechanisms configured to decelerate vehicle 400. For example, brake unit 442 may use friction to slow wheels/tires 424. As another example, brake unit 442 may convert kinetic energy of wheels/tires 424 to an electric current.

Sensor fusion algorithm 444 may be an algorithm (or a computer program product storing an algorithm) configured to accept data from sensor system 404 as an input. The data may include, for example, data representing information sensed by sensor system 404. Sensor fusion algorithm 444 may include, for example, a Kalman filter, a Bayesian network, a machine learning algorithm, an algorithm for some of the functions of the methods herein, or any other sensor fusion algorithm. Sensor fusion algorithm 444 may further be configured to provide various assessments based on the data from sensor system 404, including, for example, evaluations of individual objects and/or features in the environment in which vehicle 400 is located, evaluations of particular situations, and/or evaluations of possible impacts based on particular situations. Other assessments are possible as well.

Computer vision system 446 may be any system configured to process and analyze images captured by camera 434 in order to identify objects and/or features in the environment in which vehicle 400 is located, including, for example, traffic signals and obstacles. To that end, computer vision system 446 may use an object recognition algorithm, a Structure from Motion (SFM) algorithm, video tracking, or other computer vision techniques. In some embodiments, computer vision system 446 may additionally be configured to map the environment, track objects, estimate the speed of objects, etc.

Navigation and pathing system 448 may be any system configured to determine a driving path for vehicle 400. Navigation and pathing system 448 may additionally be configured to update a driving path of vehicle 400 dynamically while vehicle 400 is in operation. In some embodiments, navigation and pathing system 448 may be configured to incorporate data from sensor fusion algorithm 444, GPS 426, LIDAR unit 432, and/or one or more predetermined maps so as to determine a driving path for vehicle 400.

Obstacle avoidance system 450 may be any system configured to identify, evaluate, and avoid or otherwise negotiate obstacles in the environment in which vehicle 400 is located. Control system 406 may additionally or alternatively include components other than those shown.

Peripherals 408 may be configured to allow vehicle 400 to interact with external sensors, other vehicles, external computing devices, and/or a user. To that end, peripherals 408 may include, for example, a wireless communication system 452, a touchscreen/display 454, a microphone 456, and/or a speaker 458.

Wireless communication system 452 may be any system configured to wirelessly couple to one or more other vehicles, sensors, or other entities, either directly or via a communication network. To that end, wireless communication system 452 may include an antenna and a chipset for communicating with the other vehicles, sensors, servers, or other entities either directly or via a communication network. The chipset or wireless communication system 452 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen/display 454 may be used by a user to input commands to vehicle 400 and/or by vehicle 400 to output information (e.g., scanned representation of the environment, etc.) to the user of vehicle 400. To that end, touchscreen 454 may be configured to sense at least one of a position and a movement of a user's finger via capacitive sensing, resistance sensing, or a surface acoustic wave process, among other possibilities. Touchscreen 454 may be capable of sensing finger movement in a direction parallel or planar to the touchscreen surface, in a direction normal to the touchscreen surface, or both, and may also be capable of sensing a level of pressure applied to the touchscreen surface. Touchscreen 454 may be formed of one or more translucent or transparent insulating layers and one or more translucent or transparent conducting layers. Touchscreen 454 may take other forms as well.

Microphone 456 may be configured to receive audio (e.g., a voice command or other audio input) from a user of vehicle 400. Similarly, speakers 458 may be configured to output audio to the user.

Computer system 410 may be configured to transmit data to, receive data from, interact with, and/or control one or more of propulsion system 402, sensor system 404, control system 406, and peripherals 408. To this end, computer system 410 may be communicatively linked to one or more of propulsion system 402, sensor system 404, control system 406, and peripherals 408 by a system bus, network, and/or other connection mechanism (not shown).

In one example, computer system 410 may be configured to control operation of transmission 422 to improve fuel efficiency. As another example, computer system 410 may be configured to cause camera 434 to capture images of the environment. As yet another example, computer system 410 may be configured to store and execute instructions corresponding to sensor fusion algorithm 444. As still another example, computer system 410 may be configured to store and execute instructions for determining a 3D representation of the environment around vehicle 400 using LIDAR unit 432. Thus, for instance, computer system 410 could function as a controller for LIDAR unit 432. Other examples are possible as well.

As shown, computer system 410 includes processor 412 and data storage 414. Processor 412 may comprise one or more general-purpose processors and/or one or more special-purpose processors. To the extent that processor 412 includes more than one processor, such processors could work separately or in combination.

Data storage 414, in turn, may comprise one or more volatile and/or one or more non-volatile storage components, such as optical, magnetic, and/or organic storage, and data storage 414 may be integrated in whole or in part with processor 412. In some embodiments, data storage 414 may contain instructions 416 (e.g., program logic) executable by processor 412 to cause vehicle 400 and/or components thereof (e.g., LIDAR unit 432, etc.) to perform the various operations described herein. Data storage 414 may contain additional instructions as well, including instructions to transmit data to, receive data from, interact with, and/or control one or more of propulsion system 402, sensor system 404, control system 406, and/or peripherals 408.

In some embodiments, vehicle 400 may include one or more elements in addition to or instead of those shown. For example, vehicle 400 may include one or more additional interfaces and/or power supplies. Other additional components are possible as well. In such embodiments, data storage 414 may also include instructions executable by processor 412 to control and/or communicate with the additional components. Still further, while each of the components and systems are shown to be integrated in vehicle 400, in some embodiments, one or more components or systems may be removably mounted on or otherwise connected (mechanically or electrically) to vehicle 400 using wired or wireless connections. Vehicle 400 may take other forms as well.

FIGS. 5A-5E collectively illustrate a vehicle 500 equipped with multiple LIDAR devices 502, 504, 506, 508, 510, according to example embodiments. Vehicle 500 may be similar to vehicle 400, for example. Although vehicle 500 is illustrated as a car, as noted above, other types of vehicles are possible. Furthermore, although vehicle 500 may be configured to operate in autonomous mode, the embodiments described herein are also applicable to vehicles that are not configured to operate autonomously.

Figure 5A:
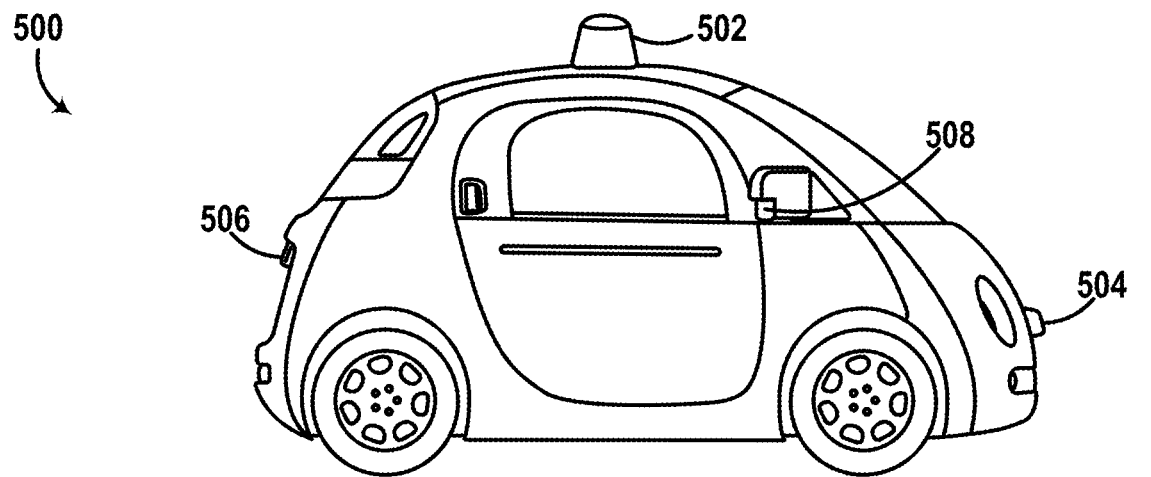
FIG. 5A illustrates several views of a vehicle equipped with multiple LIDAR devices, according to example embodiments.
Figure 5A:
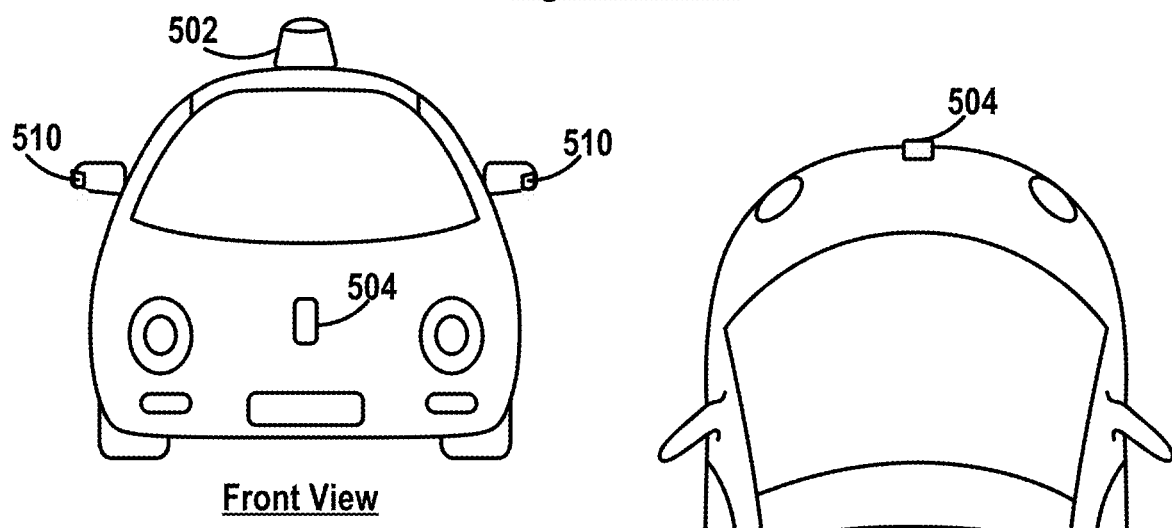
Figure 5A:
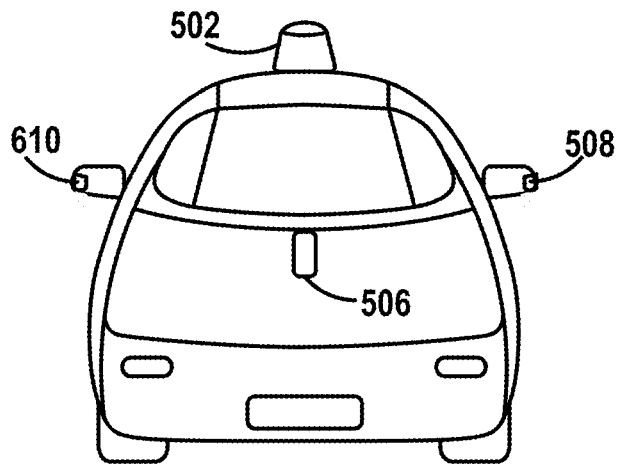
Figure 5A:
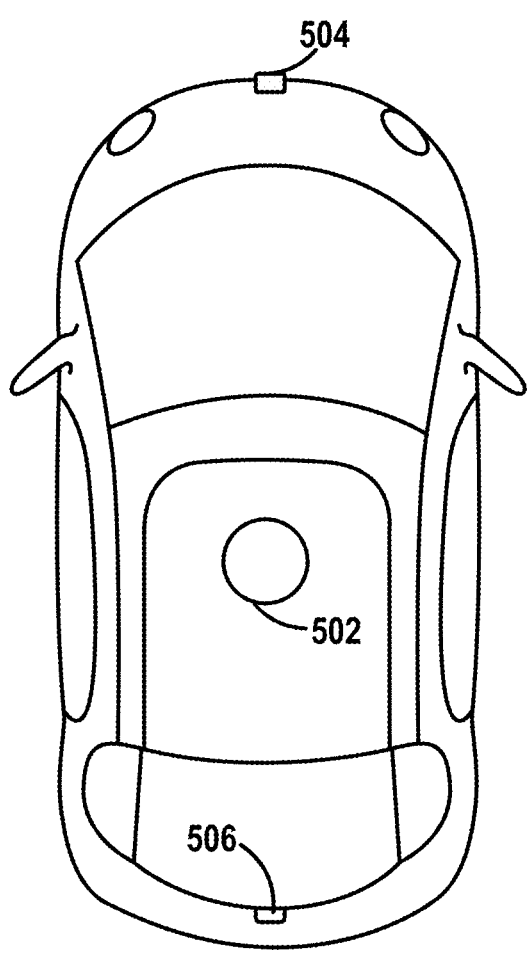

FIG. 5A shows a Right Side View, Front View, Back View, and Top View of vehicle 500. As shown, vehicle 500 includes LIDAR devices 502, 504, 506, 508, 510, which are mounted to, respectively, a top side, front side, back side, right side, and left side of vehicle 500. In alternative embodiments, one or more of LIDAR devices 502, 504, 506, 508, 510 could be positioned on any other part of vehicle 500. LIDAR devices 502, 504, 506, 508, 510 may be similar to any of system 100, LIDAR 200, and/or LIDAR 300, for example.

Figure 5B:
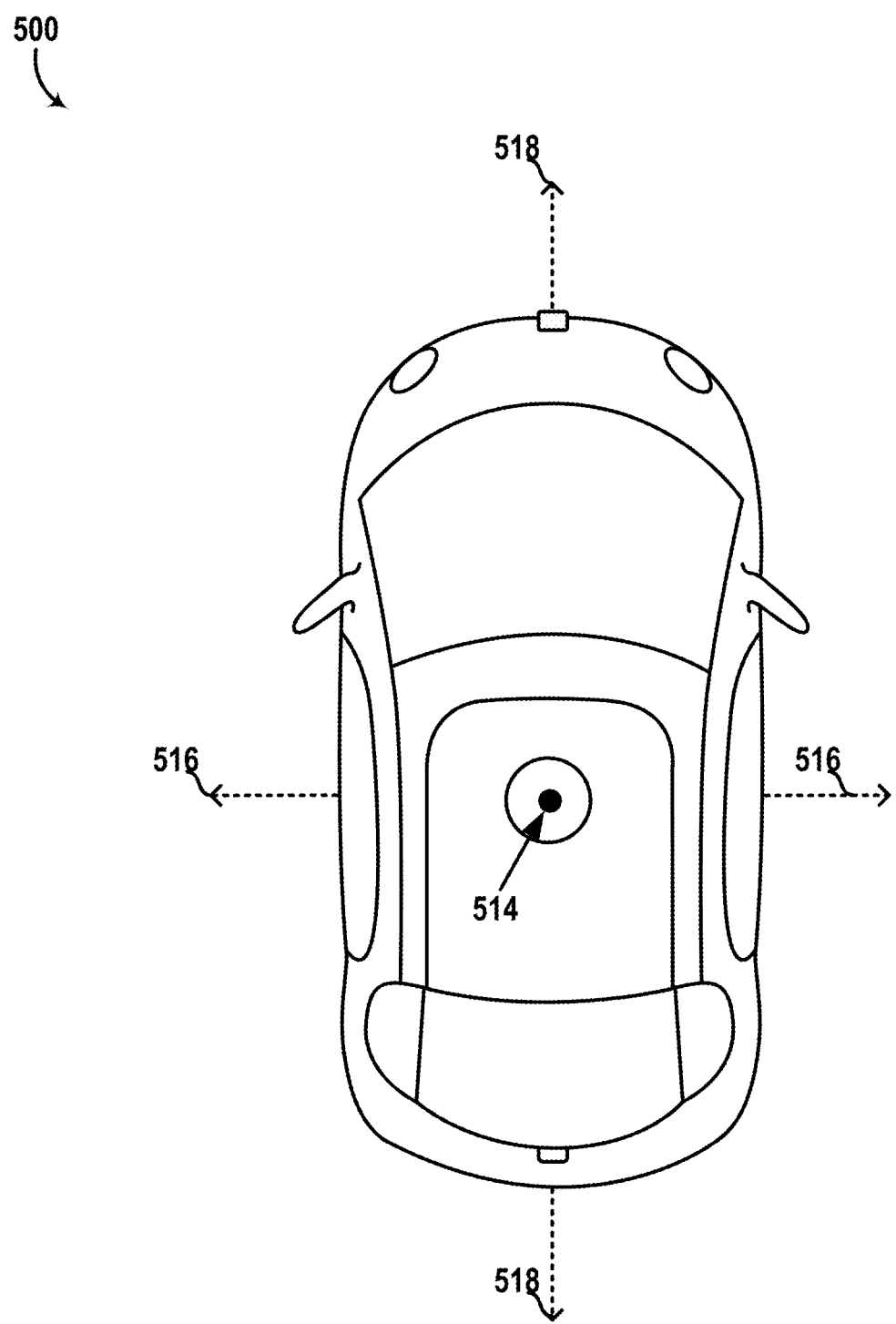
FIG. 5B illustrates a top view of the vehicle.

FIG. 5B illustrates another top view of vehicle 500. In some scenarios, vehicle 500 may rotate about one or more axes, which are shown as yaw axis 514, pitch axis 516, and roll axis 518. Yaw axis 514 may correspond to a height-wise axis extending through the top of the vehicle (and out of the page). In an example scenario, a yaw rotation of vehicle 500 about yaw axis 514 may correspond to adjusting a pointing or heading direction of vehicle 500 (e.g., direction of motion or travel along a driving surface, etc.).

Pitch axis 516 may correspond to a rotational axis that extends widthwise through the right side and left side of vehicle 500. In an example scenario, a pitch rotation of vehicle 500 about pitch axis 516 may result from an acceleration or deceleration (e.g., application of brakes, etc.) of vehicle 500. For instance, a deceleration of the vehicle may cause the vehicle to tilt toward the front side of the vehicle (i.e., pitch rotation about pitch axis 516). In this scenario, front wheel shocks (not shown) of 400 may compress to absorb the force due to the change of momentum of the vehicle, and back wheel shocks (not shown) may expand to allow the vehicle to tilt toward the front side. In another example scenario, a pitch rotation of vehicle 500 about pitch axis 516 may result from vehicle 500 traveling along a sloped driving surface (e.g., hill, etc.), thereby causing vehicle 500 to tilt upwards or downwards (i.e., pitch-wise) depending on the slope of the driving surface. Other scenarios are possible as well.

Roll axis 518 may correspond to a rotational axis that extends lengthwise through the front side and the back side of vehicle 500. In an example scenario, a roll rotation of vehicle 500 about roll axis 518 may occur in response to the vehicle performing a turning maneuver. For instance, if the vehicle performs a sudden right turn maneuver, the vehicle may bank toward the left side (i.e., roll rotation about roll axis 518) in response to a force caused by the changing momentum of the vehicle or a centripetal force acting on the vehicle due to the maneuver, etc. In another example scenario, a roll rotation of vehicle 500 about roll axis 518 may occur as a result of vehicle 500 traveling along a curved driving surface (e.g., road camber, etc.), which may cause vehicle 500 to tilt sideways (i.e., roll-wise) depending on the curvature of the driving surface. Other scenarios are possible as well.

It is noted that the positions of the various rotational axes 514, 516, 518 may vary depending on various physical characteristics of vehicle 500, such as the location of a center of gravity of the vehicle, locations and/or mounting positions of wheels of the vehicle, etc. To that end, the various axes 514, 516, 518 are illustrated as shown only for the sake of example. Thus, for instance, roll axis 518 can be alternatively positioned to have a different path through the front side and back side of vehicle 500, and yaw axis 514 may extend through a different region of the top side of vehicle 500 than that shown, etc.

Figure 5C:
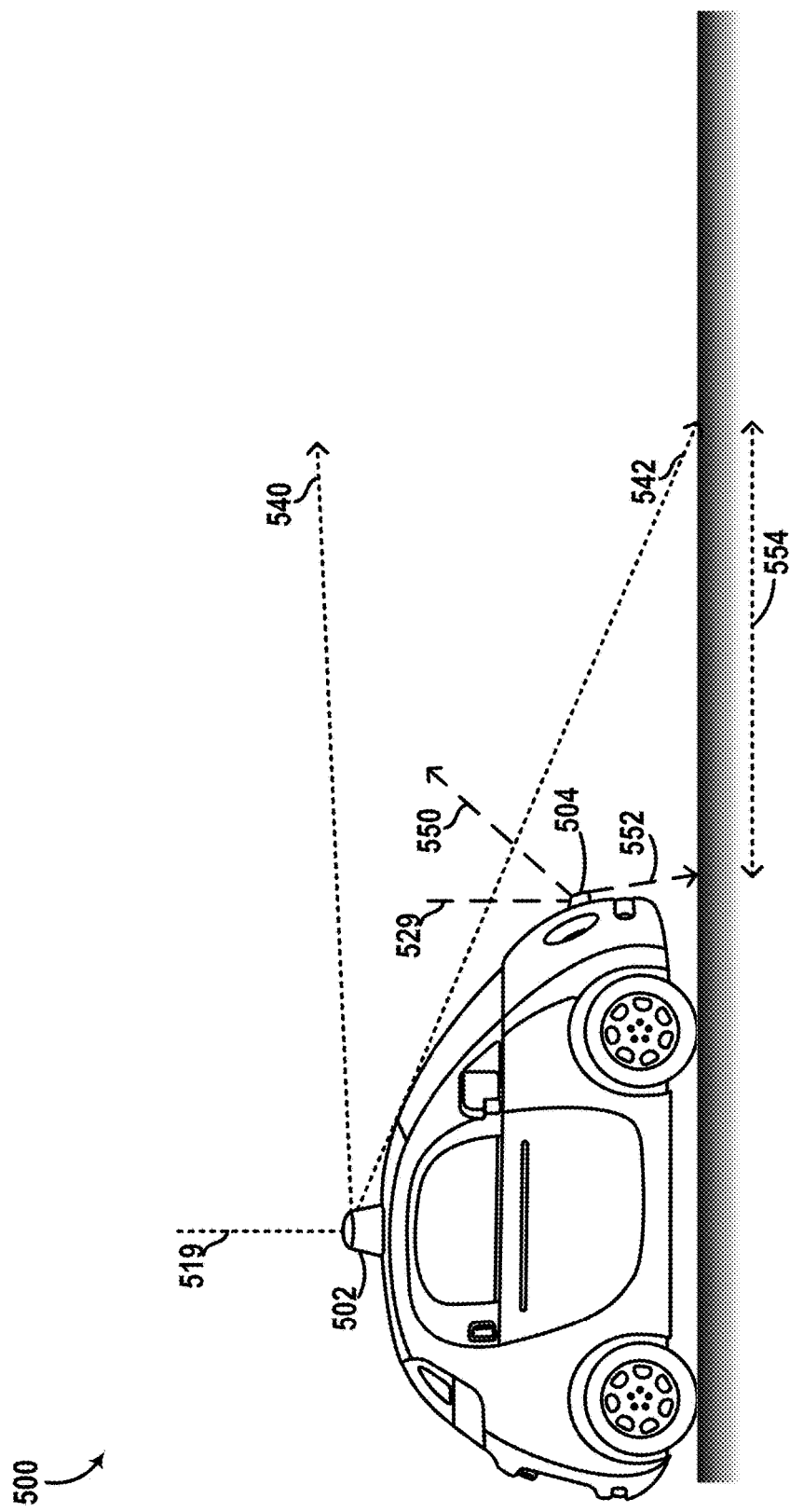
FIG. 5C illustrates a right side view of the vehicle.

FIG. 5C illustrates another right side view of vehicle 500. In FIG. 5C, arrows 540-542 and 550-552 may represent, respectively, vertical ends of the FOVs of LIDARs 502 and 504.

For instance, LIDAR 502 may emit light pulses in a region of an environment of vehicle 500 between the arrows 540 and 542, and may receive reflected light pulses from that region to detect and/or identify objects in that region. Due to the positioning of LIDAR 502 at the top side of vehicle 500, a vertical FOV scanned by LIDAR 502 (e.g., range of pitch directions of light pulses emitted by LIDAR 502) may be limited by the structure of vehicle 500 (e.g., roof, etc.) as illustrated in FIG. 5C. Additionally, the positioning of LIDAR 502 at the top side of the vehicle scan 500 may allow LIDAR 502 to have wide horizontal FOV, i.e., LIDAR 502 could scan all directions (e.g., yaw directions) around vehicle 500 by rotating about a vertical (e.g., yaw) axis 519 of LIDAR 502. In one embodiment, the vertical FOV of LIDAR 502 (e.g., angle between arrows 540 and 542) is 20°, and the horizontal FOV of LIDAR 502 is 360°. However, other FOVs are possible as well.

In some examples, LIDAR 502 may emit light in a pointing direction of LIDAR 502 (e.g., toward the right side of the page). Further, vehicle 500 can rotate LIDAR device 502 (or one or more components thereof) about axis 519 to change the pointing direction of LIDAR device 502. In one example, vehicle 500 may rotate LIDAR device 502 about axis 519 repeatedly for complete rotations. In this example, for each complete rotation of LIDAR 502 (or one or more components thereof), LIDAR 502 can scan a 360° FOV around vehicle 500. In another example, vehicle 500 may rotate LIDAR device 502 about axis 519 for less than a complete rotation (e.g., to scan a limited horizontal FOV rather than a complete 360° FOV).

In some examples, LIDAR 502 may be less suitable for scanning portions of the environment near vehicle 500. For instance, as shown, objects within distance 554 to vehicle 500 may be (at least partially) outside the FOV illustrated by arrows 540 and 542.

Thus, in some examples, LIDAR 504 could be used for scanning the environment for objects that are relatively closer to vehicle 500. For example, due to the positioning of LIDAR 104 at the front side of vehicle 500, LIDAR 504 may be more suitable for scanning the environment for objects that are near the front side and within the distance 554 to vehicle 500. As shown, for example, arrows 550 and 552 may represent the vertical ends of a second FOV of LIDAR 504. For instance, LIDAR 504 may emit light pulses in a region of an environment of vehicle 500 between the arrows 550 and 552, and may receive reflected light pulses from that region to detect and/or identify objects in that region. Additionally, due to the positioning of LIDAR 504 at the front side of vehicle 500, LIDAR 504 may have a relatively narrower horizontal FOV, i.e., LIDAR 504 could scan a limited range of horizontal directions (e.g., yaw directions) around vehicle 500 by rotating about a vertical (e.g., yaw) axis 529 of LIDAR 504. In one embodiment, the vertical FOV of the second LIDAR 504 is 95° (e.g., angle between arrows 550 and 552), and the horizontal FOV of the second LIDAR 504 is 180°. For example, the vertical FOV of LIDAR 504 may extend from a pitch angle of +21° (e.g. arrow 550) to a pitch angle of −74° (e.g., arrow 552). With this arrangement, for example, LIDAR 504 may scan the vertical extents of a nearby object (e.g., another vehicle, etc.) without any physical adjustment (e.g., tilting, etc.) of LIDAR 504. However, other FOVs are possible as well.

It is noted that the respective angles between arrows 540, 542, 550, 552 shown in FIG. 5C are not necessarily to scale and are for illustrative purposes only. Additionally, in some examples, the vertical FOVs of the various LIDARs could vary as well.

Figure 5D:
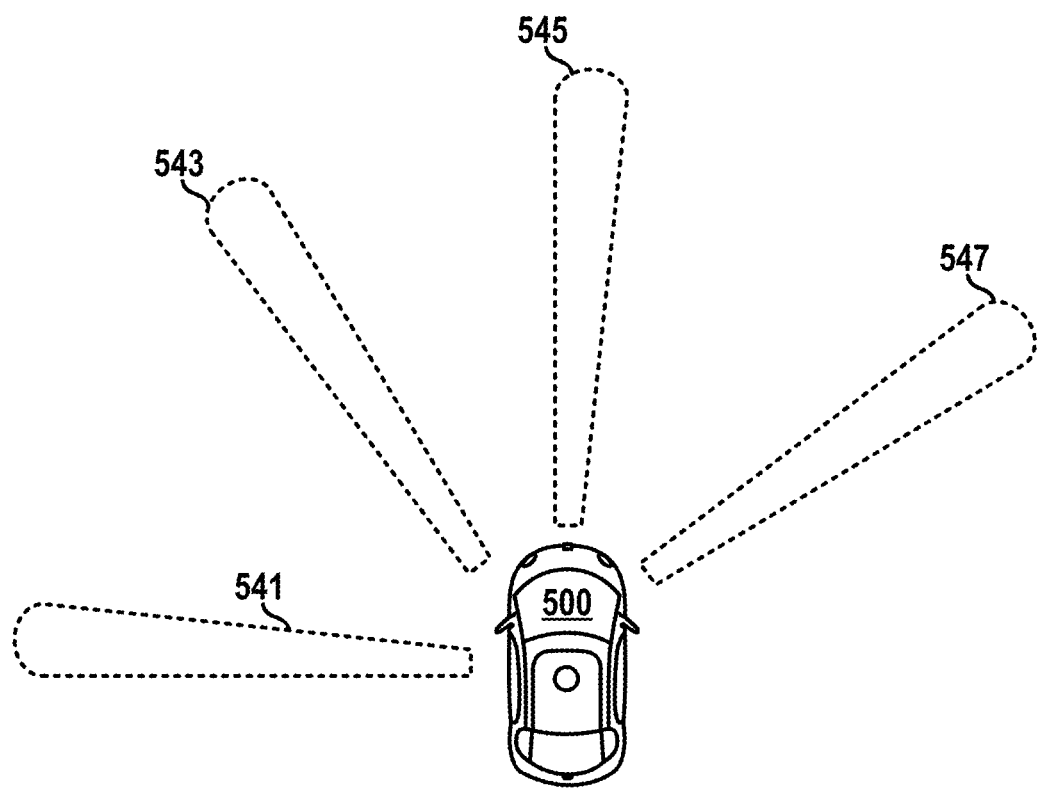
FIG. 5D illustrates another top view of the vehicle.

FIG. 5D illustrates another top view of vehicle 500. As shown, each of contours 541, 543, 545, and 547 may correspond to portions of the FOV of LIDAR 502 that are scanned when LIDAR 502 has a corresponding pointing direction associated with the contour. By way of example, contour 541 may correspond to a region scanned by LIDAR 502 when LIDAR 502 is in a first pointing direction toward the left side of the page. For instance, objects inside of contour 541 may be within a range of distances suitable for proper detection and/or identification using data from LIDAR 502. In this example, LIDAR 502 could be rotated to a second pointing direction toward the top of the page to scan the region of the environment indicated by contour 545, and so on. It is noted that contours 541, 543, 545, 547 are not to scale and are not intended to represent actual portions of the FOV scanned by LIDAR 502, but are only illustrated as shown for convenience of description.

In some examples, LIDAR 502 may be configured to rotate repeatedly about axis 519 at a given frequency (f). For instance, in an example scenario where f=15 Hz, LIDAR 502 may have a first pointing direction (associated with contour 541) fifteen times every second, i.e., after every given period (T=1/f) of time from a previous time when LIDAR 502 was at the first pointing direction. Thus, in this scenario, at time t=0, LIDAR device 502 may be at the first pointing direction associated with contour 541. In this scenario, at time t=T/4, LIDAR device 502 may be at the second pointing direction associated with contour 545 (e.g., one quarter of a complete rotation about axis 519), and so on.

As a variation of the scenario above, LIDAR 502 may alternatively have a third pointing direction associated with contour 543 at time t=0. In this scenario, at time t=T/4, LIDAR 502 could thus have a fourth pointing direction associated with contour 547. Thus, in this scenario, the phase of the rotation of LIDAR 502 (about axis 519) may be different than the phase of the rotation in the previous scenario. The difference between the two phases may be due to various reasons. For example, an initial position (e.g., at time t=0) may depend on various factors, such as when LIDAR 502 begins rotating about axis 519 (e.g., the time at which vehicle 500 provides power to LIDAR device 502), among other factors.

Figure 5E:
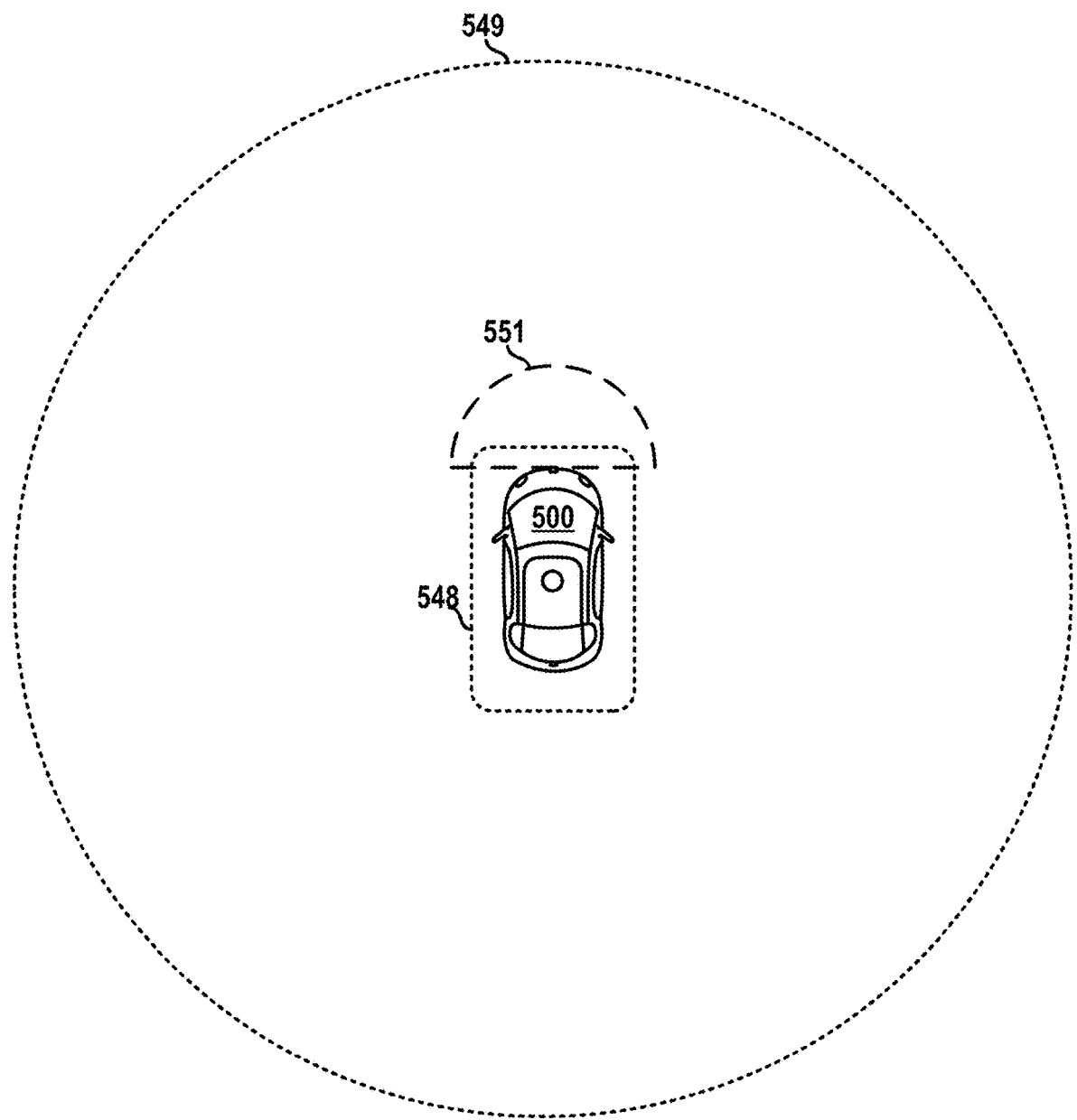
FIG. 5E illustrates yet another top view of the vehicle.

FIG. 5E illustrates another top view of vehicle 500. In FIG. 5E, contours 548 and 549 illustrate an example range of distances to the vehicle 500 where objects may be detected and/or identified based on data from LIDAR 502. Thus, a first FOV of LIDAR 502 (e.g., between contours 548 and 549) may extend horizontally to provide a 360° view of the surrounding environment. For example, LIDAR 502 could obtain a first scan of the first FOV by performing one complete rotation about axis 519. In this example, a first range of pointing directions (e.g., yaw directions) of LIDAR 502 associated with the first scan of the first FOV may include all yaw directions of LIDAR 502 (e.g., from 0° to 360°) during a complete rotation of LIDAR 502 about axis 519. Referring back to FIG. 5D for example, the first scan may involve LIDAR 502 rotating 360° from the pointing direction associated with contour 541 (i.e., back to the same pointing direction).

As shown in FIG. 5E, contour 551 illustrates a region of the environment scanned by LIDAR 504 (i.e., the second FOV scanned by LIDAR 504). As shown, the region of the environment scanned by LIDAR 504 may be limited by the structure of vehicle 500 and the mounting position of LIDAR 504. In one embodiment, LIDAR 504 in this configuration may have a horizontal FOV of 180°. In one example, LIDAR 504 could rotate a complete rotation about axis 529 (shown in FIG. 5C), and then select a portion of the sensor data collected by LIDAR 504 during the complete rotation that is associated with a particular range of yaw angles (e.g., between −90° and +90°) about axis 529. Alternatively, in another example, LIDAR 504 could rotate (e.g., back and forth) between the yaw angles of −90° and +90° to scan the horizontal FOV of 180°. Other horizontal FOVs are possible as well.

It is noted that the ranges, resolutions, and FOVs described above are for exemplary purposes only, and could vary in other configurations of vehicle 500. Additionally, the contours 548, 549, 551 shown in FIG. 5E are not to scale but are illustrated as shown for convenience of description.

Figure 6:
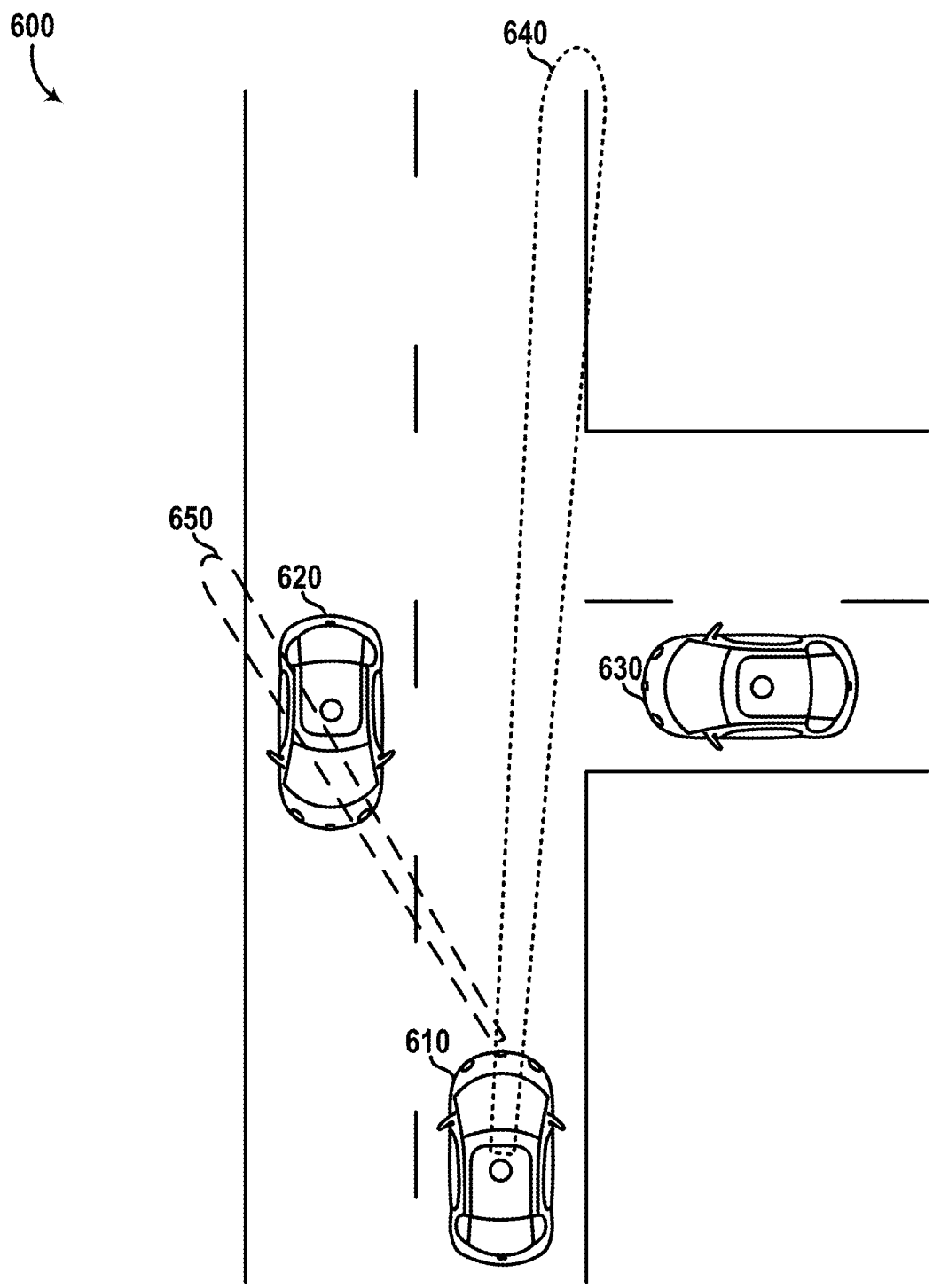
FIG. 6 is a conceptual illustration of a vehicle scanning an environment, according to example embodiments.

FIG. 6 is a conceptual illustration of a vehicle 610 scanning an environment 600, according to example embodiments. For example, similarly to vehicles 400 and 500, at least one of vehicles 610, 620, and/or 630 may be equipped with multiple sensors configured to scan environment 600. In the scenario shown, contours 640 and 650 may be similar to any of contours 543, 543, 545, 547, and may represent respective regions of environment 600 scanned by two sensors (e.g., RADAR 430, camera 434, LIDAR 502, LIDAR 504, etc.) of vehicle 610 at a particular time.

Referring back to FIG. 5E for example, contour 640 may represent a portion of the first FOV 549 of LIDAR 502 (mounted on a top side of vehicle 500) that is scanned by LIDAR 502 at the particular time (e.g., according to a first pointing direction of LIDAR 502 at the particular time). Similarly, contour 650 may represent a portion of the second FOV 551 of LIDAR 504 (mounted to the front side of vehicle 500) that is scanned by LIDAR 504 at the same particular time (e.g., according to a second pointing direction of LIDAR 504 at the particular time).

In line with the discussion above, FIG. 6 shows a scenario where the individual vehicle-mounted sensors of vehicle 610 are not synchronized with respect to one another. For instance, where the scenario shown relates to spinning LIDARs mounted on the respective vehicles, the first pointing direction (indicated by contour 640) of a first LIDAR of vehicle 610 and the second pointing direction (indicated by contour 650) of a second LIDAR of vehicle 610 have different rotation phases with respect to environment 600.

In some examples, where the first LIDAR and the second LIDAR are not synchronized, a same object in environment 600 may be scanned by the first LIDAR and the second LIDAR at substantially different times.

In a first example, both LIDARs may be configured to rotate in a clockwise direction at a rate of 10 Hz (e.g., each LIDAR may scan its respective FOV once every 0.1 seconds) but at offset rotation phases (i.e., offset between their respective pointing directions). In this example, contour 640 (of the first LIDAR) may rotate to overlap vehicle 620 approximately 0.07 seconds after vehicle 620 is scanned by the second LIDAR (associated with contour 650) of vehicle 610. During that time, vehicle 620 (and/or 610) may have moved to a different position than the position shown in FIG. 6. As a result, combining the two scans by the two LIDARs to generate a combined point cloud representation may indicate a distorted appearance for vehicle 620.

In a second example, as a variation of the example above, the two LIDARs may be rotating at different rates of rotation (e.g., first LIDAR at 10 Hz, second LIDAR at 8 Hz, etc.). Similarly, in this example, an offset between the positions of various moving objects (e.g., vehicles 620 and 630) indicated by the two scans may affect the coherence of a combined point cloud representation generated based on the two scans. Other example synchronization offsets and/or errors are possible as well.

Accordingly, within examples, multiple vehicle-mounted sensors that scan at least partially overlapping FOVs can be synchronized to facilitate combining (and/or mapping) sensor data collected by the multiple sensors simultaneously.

IV. EXAMPLE SYNCHRONIZED SENSOR

Figure 7:
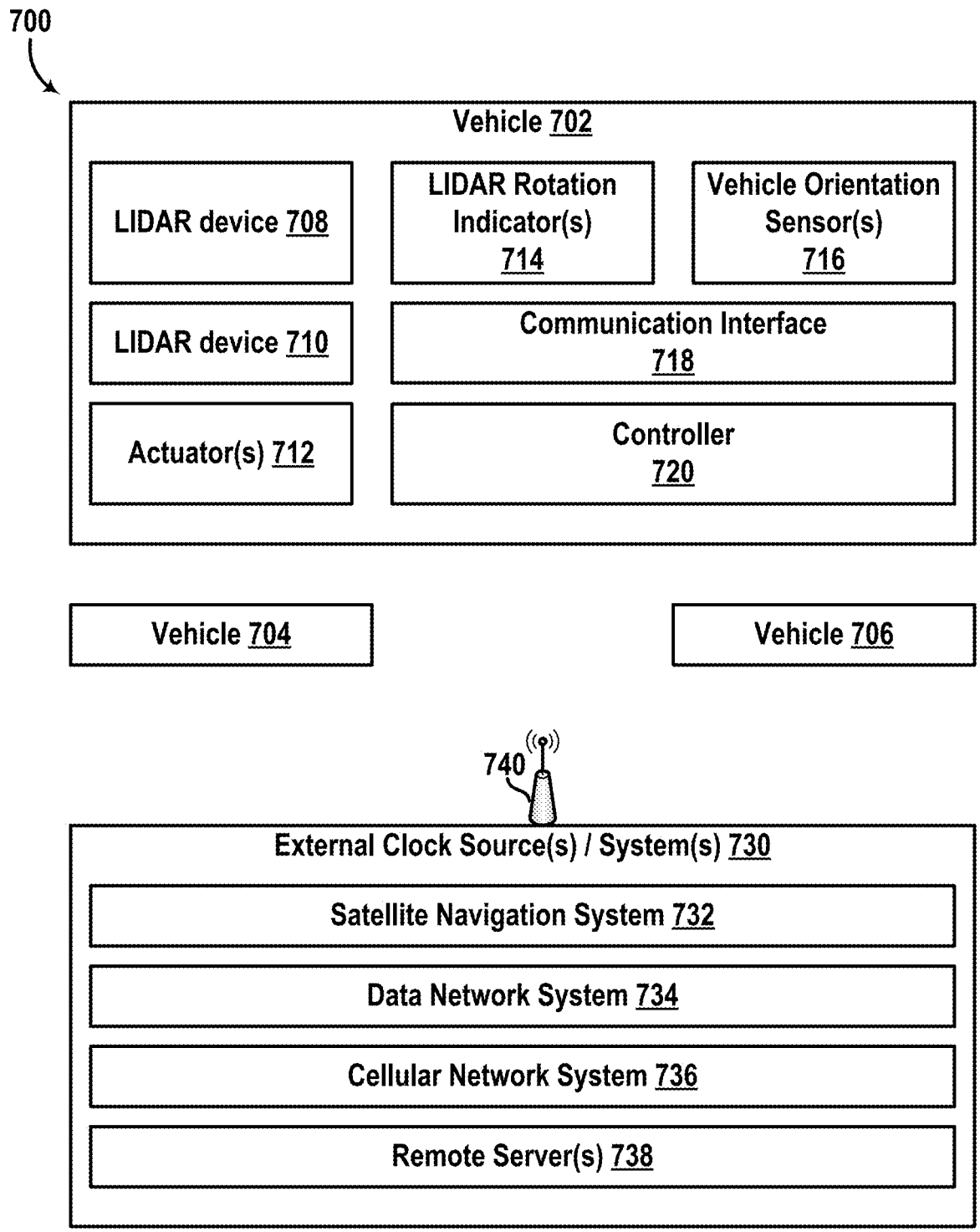
FIG. 7 is a simplified block diagram of a system, according to example embodiments.

FIG. 7 is a simplified block diagram of a system 700 for synchronizing vehicle-mounted sensors, according to example embodiments. As shown, system 700 includes vehicles 702, 704, 706 (which may be similar to any of the vehicles 400, 500, 610, 620, and/or 630), and one or more external clock sources/external systems 730.

As shown, vehicle 702 includes a first LIDAR device 708, a second LIDAR device 710, one or more actuators 712, one or more LIDAR rotation indicators 714, one or more vehicle orientation sensors 716, a communication interface 718, and a controller 720.

LIDAR devices 708 and 710 may be similar to any of system 100, devices 200, 300, 432, 502, 504, 506, 508, 510, or any other device (e.g., active sensor, etc.) that emits a signal and detects reflections of the emitted signal to scan a field-of-view (FOV) associated with a range of pointing directions of the device. Although not shown, vehicles 702, 704, and/or 706 may include other types of sensors in addition to or instead of LIDAR devices 708 and 710. For example, vehicle 702 may include a RADAR sensor (e.g., RADAR unit 430), a SONAR sensor, an active camera sensor (e.g., a sensor that emits IR or other signal having a source wavelength to illuminate a scene, and detects reflections of the emitted signal to scan the scene, etc.), among other examples. In some examples, LIDAR devices 708 and 710 can be mounted to any side of vehicle 702 (e.g., top, right, left, back, etc.).

Actuator(s) 712 may comprise one or more actuators similar to actuator(s) 436. In one example, a first actuator of actuators 712 may be configured to rotate the first LIDAR device 708 (or a rotating platform thereof such as any of rotating platforms 110, 210, or 310) about a first axis (e.g., yaw axis 219, yaw axis 519, etc.). Similarly, a second actuator of actuators 712 may be configured to rotate the second LIDAR device 710 (or a rotating platform thereof) a second axis. Further, in some implementations, the respective actuators 712 can rotate LIDAR devices 708 and/or 710 complete (or partial) rotations about their respective axis.

LIDAR rotation indicator(s) 714 may comprise any combination of devices that provide an indication of the pointing direction of LIDAR device 708 (and/or 710) relative to the vehicle 702. In one example, indicators 714 may comprise a first encoder (e.g., mechanical encoder, optical encoder, magnetic encoder, capacitive encoder, etc.) that measures a position of LIDAR device 708 about a first axis thereof (e.g., axis 519), and a second encoder that measures a position of LIDAR device 710 about a second axis thereof. For instance, the second encoder can provide an encoder value indicating an amount of rotation of the second LIDAR 710 from an initial (or reference) position about the second axis. In another example, indicators 714 may comprise a motion sensor (e.g., compass, gyroscope, accelerometer, IMU 428, etc.) that provides a measurement of motion of the LIDARs 708 and/or 710 (e.g., rotation, etc.).

Thus, in some implementations, indicators 714 may include a LIDAR direction indicator that indicates a measurement of the pointing direction of LIDAR device 708 (or 710) relative to vehicle 702 (e.g., absolute or incremental position relative to a reference pointing direction). Further, in some implementations, indicators 714 may include a LIDAR rotation indicator that indicates a measurement of a rate of change to the pointing direction of LIDAR device 708 (or 710) relative to vehicle 702 (e.g., gyroscope, etc.).

Vehicle orientation sensor(s) 716 may comprise any combination of sensors that provide an indication of an orientation of vehicle 702 in an environment. For example, sensors 716 may include a direction sensor, such as a gyroscope or compass for instance, that is mounted to vehicle 702 and aligned with a directional axis of vehicle 702 (e.g., axis 514, 516, or 518 shown in FIG. 5B). In this example, the direction sensor may provide an indication of a direction of motion of vehicle 702 relative to the environment thereof. For instance, a gyroscope sensor 716 may provide an output signal that indicates a rate of change in a pointing direction of the vehicle (e.g., yaw direction, pitch direction, roll direction, etc.) in the environment in response to motion of the vehicle. Thus, in various examples, sensors 716 may comprise a "yaw sensor" (e.g., compass, etc.) that indicates a measurement of a yaw direction of vehicle 702 (e.g., direction relative to a geographic north, etc.), and/or a "yaw rate sensor" that indicates a measurement of a yaw rate of change to a yaw direction of the vehicle in the environment. Similarly, sensors 716 may include sensors configured as "pitch sensors," "pitch rate sensors," "roll sensors," and/or "roll rate sensors."

Communication interface 718 may include any combination of wired and/or wireless communication systems that facilitate communication between vehicle 702 and external systems such as vehicles 704, 706, and/or clock sources/systems 730.

In one example, interface 718 may include a wireless communication system similar to wireless communication system 452. In this example, communication interface 718 may include one or more antennas and a chipset for communicating with the other vehicles, sensors, servers, or other entities either directly or via a communication network. The chipset or communication interface 718 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

In another example, communication interface 718 may include wired and/or wireless links configured for communication between various components of vehicle 702. In this example, communication interface 718 may include one or more components that facilitate the functions described for rotary link 122 of system 100 for instance.

In yet another example, communication interface 718 may include wired and/or wireless components that facilitate communication for a particular sensor in vehicle 702. For instance, communication interface 718 may include one or more antennas and a chipset accessible to or incorporated within a satellite navigation system (SNS) sensor (not shown), such as GPS 426 of vehicle 500. Thus, in this example, the SNS sensor may operate communication interface 718 to receive timing information from one or more satellites (e.g., external clock source/system 730), and generate a reference clock signal based on the received timing information. Other examples are possible as well.

Controller 720 may comprise one or more general-purpose or special-purpose controllers that operate the various components of vehicle 702 in accordance with the present disclosure. In one implementation, controller 720 may comprise one or more processors and data storage storing instructions executable by the one or more processors to cause vehicle 702 (and/or one or more components thereof) to perform the various functions of the present method. For example, controller 720 can be configured similarly to and/or integrated within computer system 410 of vehicle 400. Alternatively or additionally, in some implementations, controller 720 may include analog and/or digital circuitry wired to perform the various functions described herein.

In some instances, controller 720 can be implemented as multiple controllers that each perform particular functions. For instance, controller 720 may comprise a LIDAR controller (e.g., microcontroller, etc.) that operates actuator(s) 712 to adjust the pointing direction of LIDAR device 710 and/or one or more rotation characteristics (e.g., phase, frequency, direction, etc.) thereof. Further, for instance, controller 720 may comprise a system controller that operates other components of vehicle 702 (e.g., communication interface 718, etc.) and facilitates communication between the LIDAR controller and other components of the vehicle 702 (e.g., SNS sensor, communication interface 718, etc.). Other examples are possible as well.

Thus, in some implementations, controller 720 may comprise a special-purpose controller (e.g., PID controller) that modulates power provided to actuator(s) 712 to adjust the pointing direction of LIDAR device 710, the one or more rotation characteristics thereof, etc. To that end, in one implementation, controller 720 may determine a target pointing direction of LIDAR device 710 based on timing information received via communication interface 718, determine a current pointing direction of LIDAR device 710 based on data from indicator(s) 714 and/or sensor(s) 716, and modulate the power provided to actuator(s) 712 to adjust the pointing direction of LIDAR device 710 based on a difference between the target pointing direction and the current pointing direction. Other examples are possible as well and are described in greater detail within exemplary embodiments herein.

External clock source(s)/system(s) 730 may comprise one or more systems that indicate a common clock signal (and/or other timing information) and transmit the common clock signal toward an environment that includes vehicles 702, 704, and 706. For example, as shown, system(s) 730 may broadcast wireless signals 740 toward a region of the environment where multiple vehicles (e.g., vehicles 702, 704, 706, etc.) are located. In turn, each vehicle may use the broadcast common clock signal (or other timing signal) as a basis to synchronize the pointing directions of LIDARs therein (e.g., LIDARs 708 and 710) relative to the environment of the respective vehicles. In this way, multiple vehicle-mounted LIDARs scanning the environment simultaneously could have a similar pointing direction relative to the environment.

As shown, clock source(s) 730 can optionally include a satellite navigation system (SNS) 732, a data network system 734, a cellular network system 736, and/or one or more remote servers 738.

SNS 732 may comprise one or more satellite-based navigation systems, such as the Global Positioning System (GPS) system, global navigation system (GLONASS), the European global navigation satellite system (Galileo), or any other global navigation satellite system. To that end, each of vehicles 702, 704, 706 may include a suitable sensor (not shown), such as GPS 426 for instance, that is configured to receive wireless signals 740 from SNS 732 and generate a common reference clock signal based on signals 740. In one example, the reference clock signal may be a pulse per second (e.g., PPS) signal that is synchronized with an atomic clock or other clock in SNS 732. In another example, the reference clock signal may be a coordinated universal time (UTC) signal. Other examples are possible as well.

Data network system 734 may comprise one or more network servers accessible to vehicles 702 (e.g., via interface 718), 704, 706. For example, system 734 may comprise network servers connected to one another via a local area network or a private or public network (e.g., the Internet, etc.) to provide an interface for transmitting data communication packets between vehicles 702, 704, 706 and/or other network entities. To that end, in one implementation, system 734 may broadcast encrypted signals 740 towards vehicles 702, 704, 706, with timing information that can be used to synchronize the timing of the respective vehicles (and/or components thereon). In one implementation, signals 740 may indicate a network time protocol (NTP) reference clock signal (or any other network time signal) based on data from the one or more network servers accessible to vehicle 702 (via interface 718) as well as other vehicles 704, 706. Thus, vehicles 702, 704, 706 can use the timing information from system 734 to generate a common NTP reference clock signal (or other network clock signal) for synchronously timing the rotation, and/or otherwise adjusting the pointing directions of the LIDARs therein (e.g., LIDARs 708 and 710) synchronously.

Cellular network system 736 may comprise one or more base stations that broadcast wireless signals 740 to define a cellular coverage area of system 736. Thus, for example, if vehicles 702, 704, 706, are located within the cellular coverage area defined by signals 740, then vehicles 702, 704, 706 can receive a common reference clock signal from system 736, and use the reference clock signal to adjust the pointing directions of LIDARs mounted thereon, in line with the discussion above.

Remote server(s) 738 may include one or more servers accessible to vehicles 702 (e.g., via interface 718), 704, 706 similarly to the network servers of system 734. In some implementations, server(s) 738 may include servers of a vehicle control system that provides information to vehicles 702, 704, 706 about nearby vehicles, and/or other common information. Thus, in one implementation, server(s) 738 may communicate an indication of a selected clock source from sources 732, 734, and/or 736 that vehicles 702, 704, 706 should use to establish a common reference clock signal. In another implementation, server(s) 738 may communicate a reference clock signal to the vehicles 702, 704, 706. Other implementations are possible as well.

It is noted that the various functional blocks illustrated in FIG. 7 can be re-arranged or physically implemented in different combinations than those shown. Thus, in some examples, the one or more of the components of vehicle 702 can be physically implemented within a single or several devices.

In a first example, although not shown, LIDAR device 708 (or 710) can alternatively include one or more of actuator(s) 712, indicator(s) 714, communication interface 718, and/or controller 720. In this example, actuator(s) 712, indicator(s) 714, interface 718, and/or controller 720 can be implemented within a stationary portion (e.g., stationary platform 112) and/or a rotating portion (e.g., rotating platform 110) of LIDAR device 708 (or 710). Further, in this example, controller 720 can receive information about an orientation of vehicle 702 from sensors 716 via communication interface 718, and then adjust the pointing direction of LIDAR device 708 (or 710) accordingly. Thus, in some examples, controller 720 can be physically implemented as three separate controllers: a first LIDAR controller of the first LIDAR device 708, a second LIDAR controller of the second LIDAR device 710, and a system controller of vehicle 702. Other examples are possible.

In a second example, although not shown, communication interface 718 can be at least partially implemented within a satellite navigation sensor (not shown), such as GPS 426 for instance. Thus, in this example, the satellite navigation sensor can operate interface 718 to receive signals 740 from SNS 732 and provide a reference clock signal to controller 720 for adjusting the pointing direction of LIDAR devices 708 and 710 synchronously.

In a third example, remote server(s) 738 can be physically implemented as a separate computing system that is not a clock source 730, but rather a control system that indicates to vehicles 702, 704, 706 which of clock sources 732, 734, 736 to use as a source for the reference clock signal.

In a fourth example, some or all of the functions described for the controller 720 can be implemented by an external system (e.g., remote server(s) 738). For instance, server(s) 738 can receive the various information collected using indicator(s) 714 and/or sensor(s) 716 of vehicle 702 and similar information from vehicles 704 and 706. In this instance, server(s) 738 can then determine a target pointing direction and transmit an indication thereof (e.g., signals 740) for use by vehicles 702, 704, 706.

In a fifth example, some or all of the functions described for external clock source(s) 730 can be alternatively or additionally performed using a clock source inside vehicles 702, 704, and/or 706. For instance, vehicle 702 may include an internal clock source. In this instance, controller 720 can use the internal clock source for synchronizing the pointing directions of LIDAR devices 708 and 710. In some examples, controller 720 can use the internal clock to adjust the pointing directions of LIDAR devices 708 and 710 in response to a determination that vehicle 702 is not connected (and/or unable to connect) to external clock source(s) 730. Thus, vehicle 702 can synchronize the pointing directions of LIDARs 708 and 710 without necessarily connecting to a common external clock source.

It is noted that system 700 may include additional or fewer components than those shown, such as any of the components of system 100, devices 200, 300, and/or vehicles 400, and 500. For example, although FIG. 7 shows three vehicles 702, 704, and 706, system 700 may alternatively include fewer or additional vehicles.

Figure 8:
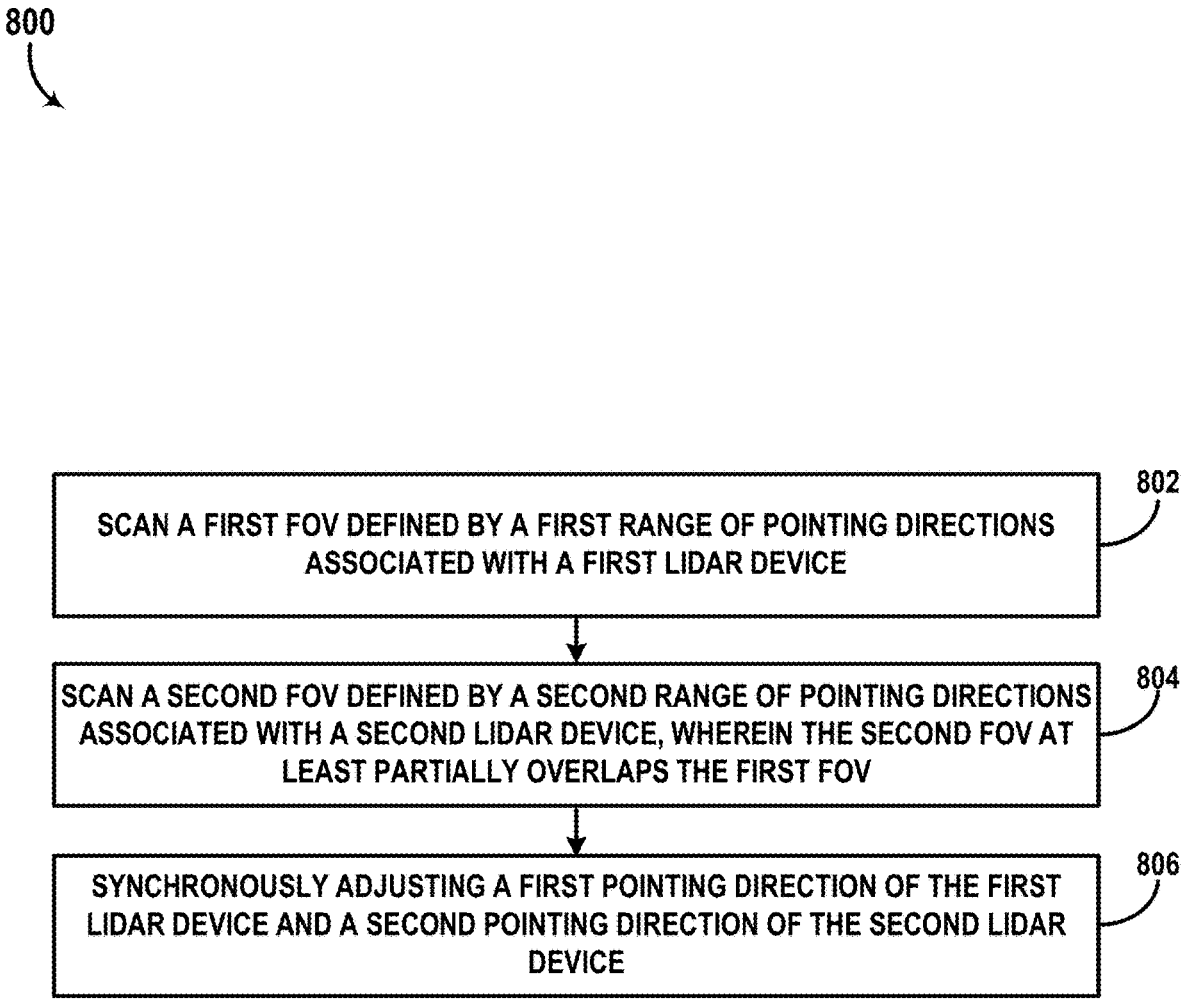
FIG. 8 is a flowchart of a method, according to example embodiments.

FIG. 8 is a flowchart of a method 800, according to example embodiments. Method 800 presents an embodiment of a method that could be used with any of system 100, devices 200, 300, vehicles 400, 500, and/or system 700, for example. Method 800 may include one or more operations, functions, or actions as illustrated by one or more of blocks 802-806. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 800 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 800 and other processes and methods disclosed herein, each block in FIG. 8 may represent circuitry that is wired to perform the specific logical functions in the process.

At block 802, method 800 involves scanning a first field-of-view (FOV) defined by a first range of pointing directions associated with a first LIDAR device. As shown in FIG. 5E for example, the first FOV of the first LIDAR 502 of vehicle 500 may correspond to a region of the environment between contours 548 and 549 (e.g., 360° FOV). In this example, as shown in FIG. 5D, the first LIDAR may scan the first FOV by rotating (clockwise or counterclockwise) from the pointing direction associated with contour 545 for one complete rotation back to the same pointing direction of contour 545.

Thus, in one example, the first LIDAR device can be configured to rotate one complete rotation about an axis (e.g., axis 519) to scan a combined 360° FOV. In another example, the first LIDAR device can be configured to rotate within a smaller range of pointing directions (e.g., sweep back and forth between two pointing directions). As shown in FIG. 5D for instance, the LIDAR device can be configured to scan a smaller FOV by rotating back and forth between the pointing directions associated with contours 543 and 547.

In some examples, the first LIDAR device may be mounted to a vehicle at a first mounting position. Referring back to FIG. 5A for example, LIDAR 502 may be mounted at the first mounting position shown (e.g., on the top side of the vehicle). In some examples, the first FOV may also be defined by the first mounting position of the first LIDAR device.

In some examples, method 800 may involve using a different type of sensor (e.g., RADAR unit 432, camera 434, SONAR sensor, etc.) that emits and/or detects a different type of signal (e.g., radio waves, sound waves, etc.) instead of or in addition to the first LIDAR device.

In a first example, camera 434 may be configured as an active camera that emits a signal at a source wavelength (e.g., infrared signal, etc.) to illuminate a scene, and then detects reflections of the emitted signal to scan the scene. Accordingly, in some implementations, method 800 involves rotating a sensor that emits signals in the first range of pointing directions to scan the first FOV. Rotating the sensor, for example, may change the pointing direction of the sensor such that the sensor scans a region of an environment from which the emitted signals are reflected.

In a second example, camera 434 may be configured as a passive camera that detects signals from returning from a range of directions in a scene. For instance, the camera may include an array of image pixel sensors. A first row of image pixel sensors may detect light from a first portion of a FOV of the camera, a second row of image pixel sensors adjacent to the first row may detect light from a second portion of the FOV adjacent to the first portion, and so on. Further, in this example, the camera may be operated in a rolling shutter mode configuration to generate an image of the scene by first measuring the outputs of the first row, then the outputs of the second row, and so on. Thus, in this example, each row of image pixel sensors may correspond to a respective pointing direction of the range of pointing directions associated with the camera that together define the FOV of the camera. Other examples are possible as well.

At block 804, method 800 involves scanning a second FOV defined by a second range of pointing directions associated with a second LIDAR device. The second FOV at least partially overlaps the first FOV. Referring back to FIG. 5E for example, the second FOV (scanned by the second LIDAR 504 of vehicle 500) may correspond to the region associated with contour 551, which partially overlaps the first FOV (between contours 548 and 549) of the first LIDAR. Further, as shown in FIG. 5E, the second range of pointing directions associated with the second LIDAR (e.g., yaw angle range of −90° to +90°) may be different from the first range of pointing directions associated with the first LIDAR (e.g., yaw angle range of 0° to +360°).

In some examples, the second LIDAR device may be mounted to the vehicle at a second mounting position different than the first mounting position of the first LIDAR device on the vehicle. Referring back to FIG. 5A for example, LIDAR 504 may be mounted at the second mounting position shown (e.g., on the front side of the vehicle). In some examples, the second FOV may also be defined by the second mounting position of the second LIDAR device.

At block 806, method 800 involves synchronously adjusting a first pointing direction of the first LIDAR device and a second pointing direction of the second LIDAR device.

In a first implementation, the synchronous adjustment at block 806 may involve aligning the first pointing direction and the second pointing direction with a same particular direction during the adjustment of the first pointing direction and the second pointing direction. Referring back to FIGS. 5A-5B for example, vehicle 500 may adjust the respective pointing directions of LIDARs 502, 504, 506, 508, 510 to correspond to a same particular yaw direction about yaw axis 514 of vehicle 500 at a particular time. For instance, vehicle 500 can use a common timing signal to select a target yaw direction for scanning at a particular time, and then operate each LIDAR accordingly (e.g., by providing a timing signal or other control signal that indicates the target yaw direction and/or the particular time to each LIDAR controller of the respective LIDARs, etc.).

Accordingly, in some examples, the synchronous adjustment at block 806 may involve causing the first pointing direction of the first LIDAR device to correspond to a particular direction at a particular time, and causing the second pointing direction of the second LIDAR device to correspond to the particular direction at the particular time.

In a second implementation, where the first LIDAR and the second LIDAR rotate about respective axes, the synchronous adjustment at block 806 may involve synchronizing a direction of the rotation of the first LIDAR device with a direction of the rotation of the second LIDAR device. Referring back to FIG. 6 for example, vehicle 610 may cause the first LIDAR device (e.g., associated with contour 640) and the second LIDAR device (e.g., associated with contour 650) to rotate in a clockwise direction while scanning their respective FOVs. Alternatively, both LIDARs can be configured to rotate in a counterclockwise direction about their respective axes.

In a third implementation, where the first LIDAR and the second LIDAR rotate about respective axes, the synchronous adjustment at block 806 may involve synchronizing a phase of the rotation of the first LIDAR device with a phase of the rotation of the second LIDAR device. Referring back to FIG. 6 for example, vehicle 610 may cause the first LIDAR device (e.g., associated with contour 640) and the second LIDAR device (e.g., associated with contour 650) to regulate their rotational positions about their respective yaw axes such that both contours 640 and 650 are parallel to one another during the rotation of the two LIDARs.

In a fourth implementation, where the first LIDAR and the second LIDAR rotate about respective axes, the synchronous adjustment at block 806 may involve synchronizing a rate of the rotation of the first LIDAR device with a rate of the rotation of the second LIDAR device. In one example, a system of method 800 (e.g., system 100, vehicle 400, vehicle 500, etc.) may cause the first LIDAR to complete one rotation about a first yaw axis of the first LIDAR during a particular period of time, and cause the second LIDAR to complete one rotation about a second yaw axis of the second LIDAR during the same particular period of time. For instance, the example system can an indication of a target rate of rotation (e.g., 3 Hz, 10 Hz, 15 Hz, 30 Hz, etc.) for receipt by a first LIDAR controller (e.g., controller 104, etc.) of the first LIDAR and a second LIDAR controller of the second LIDAR.

In a fifth implementation, where the first LIDAR and the second LIDAR rotate about respective axes, the synchronous adjustment at block 806 may involve aligning a first axis of rotation of the first LIDAR device with a second axis of rotation of the second LIDAR device. Referring back to FIG. 5A for example, vehicle 500 can align the first axis of rotation of the first LIDAR 502 and the second axis of rotation of the second LIDAR 504 to be parallel to yaw axis 514 (shown in FIG. 5B) of vehicle 500. For instance, vehicle 500 can tilt a rotating platform of the first LIDAR device and/or the second LIDAR device (e.g., platform 310 of LIDAR 300, etc.) based on measurements of the orientation of the vehicle (e.g., via sensors 716 shown in FIG. 7, etc.).

Accordingly, in some examples, the adjustment at block 806 may involve rotating the first LIDAR device about a first axis and the second LIDAR device about a second axis; and synchronizing one or more rotation characteristics of the first LIDAR device with corresponding rotation characteristics of the second LIDAR device. As noted above for example, the one or more rotation characteristics of the first LIDAR device may include a phase of the rotation of the first LIDAR device, a rate of the rotation of the first LIDAR device, a direction of the rotation of the first LIDAR device, or the first axis of the rotation of the first LIDAR device.

In a sixth implementation, where the first LIDAR is mounted at a first mounting position and the second LIDAR is mounted at a second mounting position, the synchronous adjustment at block 806 may additionally or alternatively be based on the first mounting position and/or the second mounting position. Referring back to FIG. 5C for example, the first LIDAR (502) may be mounted at the top side of vehicle 500 and the second LIDAR (504) may be mounted at the front side of the vehicle. In some instances, if the respective yaw directions of the two LIDARs are parallel to one another, then the respective portions of the FOV might not overlap one another (e.g., due to parallax associated with the different mounting positions of the two LIDARs).

Accordingly, in some examples, a system of method 800 may account for the difference between the respective mounting positions of the two LIDARs by adjusting the first pointing direction (and/or the second pointing direction) such that respective portions of the first FOV and the second FOV scanned at a particular time overlap one another. For example, the respective yaw directions of the two LIDARs at the particular time may be aligned with a location of a target object in the environment such that both LIDARs are scanning the target object simultaneously at the particular time. For instance, where the two LIDARs are rotating about their respective axes, the respective phases of the rotation of one or both LIDARs can be dynamically adjusted such that the target object (e.g., another vehicle, etc.) is scanned simultaneously by both LIDARs (e.g., despite the parallax associated with the different mounting positions of the two LIDARs).

In some examples, method 800 may involve tracking one or more target objects in an environment. In these examples, the synchronous adjustment at block 806 may involve aligning, at a first time, the first pointing direction toward a first target object and the second pointing direction toward the first target object. Additionally or alternatively, in these examples, the synchronous adjustment at block 806 may involve aligning, at a second time, the first pointing direction toward a second target object and the second pointing direction toward the second target object.

Accordingly, in a system where two LIDARs are rotating about their respective yaw axes for instance, the system may be configured to track multiple target objects (e.g., in a region of the environment where the first FOV overlaps the second FOV, etc.) using both LIDARs simultaneously by dynamically adjusting the phase of rotation of one (or both) LIDARs to align the first pointing direction (and the second pointing direction) toward a first target object at a first time, then toward a second target object at a second time, and so on.

In some examples, a system of method 800 could use a reference timing signal to coordinate the adjustment of the first and second pointing directions synchronously at block 806. The reference timing signal can be obtained from an external system (e.g., GPS clock signal, etc.), and/or generated by the example system (e.g., a first LIDAR controller of the first LIDAR device, a second LIDAR controller of the second LIDAR device, and/or a system controller of the system or vehicle that includes the first LIDAR device and the second LIDAR device).

Accordingly, in some implementations, method 800 involves receiving timing information (e.g., timing signal, clock signal, etc.) from an external system. In some examples, the received timing information may correspond to signals broadcast by an external clock source (e.g., 730) toward an environment of the first LIDAR device and the second LIDAR device.

In a first example, the external clock source/system may relate to a satellite navigation system (e.g., system 732). In this example, a system of method 800 may include a satellite navigation sensor (e.g., GPS 426) that wirelessly receives data (e.g., 740) from the satellite navigation system indicating the reference clock signal.

In a second example, the external clock source/system may relate to one or more networks accessible to the LIDAR device (e.g., via communication interface 718), and a system of method 800 may thus determine a network time protocol (NTP) reference clock signal (or other network clock signal) based on data from the one or more network servers.

In a third example, the external clock source/system may relate to timing information provided by a cellular communication network (e.g., system 736) accessible to the LIDAR device (e.g., via communication interface 718, and thus a system of method 800 may determine a reference clock signal (e.g., system time, UTC time, etc.) based on data from the cellular communication network (e.g., system time from a base station, etc.).

In a fourth example, the external system may be a remote server (e.g., autonomous vehicle server) that is in communication with a system (e.g., vehicle, etc.) of method 800, in line with the discussion for server(s) 738 for instance.

In a fifth example, the external system may include a computing system (e.g., system 410, etc.) of another vehicle that does not include the first LIDAR device and the second LIDAR device. Referring back to FIG. 7 for instance, vehicle 702 may establish one or more communication link(s) (e.g., via communication interface 718) with one or more other vehicles (e.g., vehicle 704, 706, etc.). Vehicle 702 may then select or establish a common clock signal generated by the other vehicle for synchronizing the adjustment of the pointing directions of first LIDAR 708 and second LIDAR 710.

In some implementations, method 800 involves obtaining timing information (e.g., reference timing signal, reference clock signal, etc.) for synchronously adjusting the first and second pointing directions at block 806 from a clock source of a system that performs method 800 in addition to or instead of receiving timing information from an external system.

In a first example, vehicle 702 may include an internal clock (e.g., high precision clock, atomic clock, crystal oscillator, or other clock) that provides a reference timing signal. For instance, system controller 720 can generate a reference clock signal (e.g., based on output from a crystal oscillator, piezoelectric oscillator, etc.), and then provide the reference timing signal to a first LIDAR controller (e.g., controller 104) of the first LIDAR device and a second LIDAR controller of the second LIDAR device. Alternatively or additionally, the first LIDAR controller (e.g., controller 104) can generate and provide the reference clock signal for receipt by the second LIDAR controller. Thus, in this example, a system of method 800 can generate a reference timing signal internally for synchronizing the adjustment at block 806, without necessarily connecting to an external system to retrieve a common external clock signal generated by the external system.

In a second example, a system of method 800 may intermittently (e.g., during initialization of the vehicle, initialization of an autonomous mode of the vehicle, initialization of the first and/or second LIDAR devices, or in response to any other event) or periodically update or calibrate internal clocks used for timing the adjustment of the first and second LIDAR devices. For example, a first LIDAR controller (e.g., controller 104) of the first LIDAR device may calibrate its internal clock using a reference clock signal generated by a system controller (e.g., controller 720, computer system 410, etc.) or generated by an external clock source (e.g., external clock sources 730). Similarly, a second LIDAR controller of the second LIDAR device can calibrate its internal clock using the same reference clock signal. In this way, a system of method 800 could synchronize the adjustment of the first and second pointing directions at block 806 even during periods of time when a connection to an external system is unavailable or unreliable (e.g., low signal quality), or when a connection between the first LIDAR device and the second LIDAR device is unavailable or unreliable.

In some implementations, an example system of method 800 may be configured to adjust the pointing direction of a sensor (e.g., the first LIDAR device, the second LIDAR device, RADAR sensor, SONAR sensor, etc.) by providing a modulated power signal to the sensor. In a first example, the sensor may include an array of transmitters (e.g., RADAR antennas, SONAR transducers, light sources, etc.), and the system may provide phase-shifted control signals to the individual transmitters in the array such that an effective pointing direction of the combined signal from the array is adjusted (e.g., via constructive and/or destructive interference between the individual transmitters), such as in a phased array configuration. In a second example, the first LIDAR device (and/or the second LIDAR device) may include one or more light sources coupled to reflective surfaces (e.g., phased optics array) or other optical element arrangement (e.g., optical phased array) to similarly adjust the pointing direction of the first LIDAR device even without rotating the first LIDAR device. Other examples are possible.

In some implementations, method 800 may involve modulating power provided to the first LIDAR device (or the second LIDAR device) to cause an adjustment of the pointing direction of the first LIDAR device. For example, controller 104 can modulate a power signal provided to an actuator 114 (that rotates platform 110) to control one or more rotational characteristics (e.g., rate of rotation, etc.) of platform 110.

In some implementations, the first LIDAR device may be configured to rotate (e.g., via actuator(s) 712) about a first axis. In these implementations, method 800 may also involve determining a target frequency of rotation of the first LIDAR device about the first axis (and assigning the same target frequency for rotation of the second LIDAR device about a second axis).

In some implementations, method 800 may also involve determining a yaw rate of change to a yaw direction of a vehicle that mounts the first LIDAR device and the second LIDAR device. For example, vehicle 702 may obtain a measurement of the yaw direction (or yaw rate) using sensor(s) 716. Further, in some examples, the yaw direction or yaw rate can be determined based on a combination of vehicle orientation sensors. For example, the vehicle may be performing a turning maneuver (which may cause the pitch and/or roll orientation of the vehicle to temporarily change) or moving along a sloped surface (e.g., a banked road or ramp that is tilted such that the vehicle may have a pitch and/or roll offset compared to a scenario where the vehicle is on a surface that is not tilted). In this example, the measurements by a "yaw sensor" aligned with axis 514 of vehicle 500 may be biased due to the pitch/roll orientation of the vehicle during the turning maneuver or while driving on the sloped surface. Accordingly, the yaw direction (or yaw rate) of the vehicle can be adjusted based on a combination of outputs from a yaw sensor (e.g., gyroscope aligned with axis 514), a pitch sensor (e.g., gyroscope aligned with axis 516), and/or a roll sensor (e.g., gyroscope aligned with axis 518), etc.

Additionally, in some implementations, method 800 may also involve determining an adjusted target rate of change to the pointing direction (or an adjusted target frequency of rotation) of each LIDAR device based on the measured yaw direction (and/or yaw rate) of the vehicle to which the LIDAR device is mounted.

In one example, determining the adjusted target rate of change may involve determining an adjustment for a direction of rotation of each LIDAR device about its respective axis. Referring back to FIG. 6 for instance, determining the adjusted target rate of change (or adjusted target rotation frequency) may involve aligning the direction of rotation of the first and second LIDARs mounted thereon relative to environment 600 (e.g., either clockwise or counterclockwise, etc.).

In another example, determining the adjusted target rate of change (or the adjusted target frequency of rotation) may be based on a yaw rate of change to the yaw direction of the vehicle on which the first and second LIDAR devices are mounted. Referring back to FIG. 6 for instance, if vehicle 610 is performing a right turn maneuver and the LIDAR devices thereon have a nominal target frequency of rotation (e.g., 15 Hz) in the clockwise direction, then a system of method 800 may reduce the adjusted target frequency of rotation while vehicle 610 is performing the turning maneuver. On the other hand, if the nominal target frequency of rotation is in the counterclockwise direction, then the system of method 800 may increase the adjusted target frequency of rotation while vehicle 610 is performing the turning maneuver.

In some implementations, method 800 involves determining a target pointing direction based on a reference timing signal; modulating power provided to a first actuator of the first LIDAR device based on a difference between the target yaw direction and a measurement of the first pointing direction of the first LIDAR device; and modulating power provided to a second actuator of the second LIDAR device based on a difference between the target yaw direction and a measurement of the second pointing direction of the second LIDAR device.

By way of example, a modulated power signal provided to each actuator ((e.g., actuator 114) that rotates each LIDAR device can be generated as follows.

The adjusted target frequency determined for each LIDAR device of method 800 can be represented by equation [1] below.

$$\text{adjusted\_target\_frequency} = \text{nominal\_target\_frequency} - \text{vehicle\_yaw\_rate} \quad [1]$$

Thus, in some implementations, method 800 may also involve determining a difference between the adjusted target change to the pointing direction (or adjusted target frequency of rotation) of the LIDAR device and a measured change to the pointing direction (or measured frequency of rotation), as shown in equation [2] below.

$$\text{frequency\_error} = \text{adjusted\_target\_frequency} - \text{measured\_frequency} \quad [2]$$

The measured_frequency, for instance, may correspond to a measured frequency of rotation of the LIDAR device relative to the vehicle on which the LIDAR device is mounted (e.g., output of indicator(s) 714). Thus, for instance, frequency_error can map the rate of change to the pointing direction of the LIDAR device relative to the vehicle to a rate of change of the pointing direction of the LIDAR device relative to the environment. Through this process, for instance, the LIDAR device can scan a region of the environment during a turning maneuver at the same scanning resolution that it would otherwise have if the vehicle was travelling in a straight path instead.

Further, as noted above, method 800 may involve determining a target pointing direction for each of the first and second LIDAR devices based on a common or reference clock signal. For example, a system of method 800 may perform the computation shown in equation [3] below.

$$\text{target\_direction} = (360 * \text{reference\_time} * \text{target\_frequency} - \text{vehicle\_orientation}) \bmod (360) \quad [3]$$

where target_direction is the target pointing direction, reference_time is the reference time or clock signal, vehicle_orientation is a yaw direction of the vehicle in the environment (e.g., determined using sensor(s) 716), and the function mod corresponds to the modulus function. In some examples, the "target_frequency" in equation [3] can be replaced by the adjusted_target_frequency described in equation [1].

In some examples, the target_direction computation of equation [3] may be adjusted to account for a difference between mounting positions of a first LIDAR device and a second LIDAR device that are synchronously operated in line with the discussion at block 806 of method 800. Referring back to FIG. 5C for example, a first target_direction computed for LIDAR 502 at a particular reference_time may differ from a second target_direction computed for LIDAR 504 at the particular reference_time by an offset that is based on the respective mounting positions of the two LIDARs (e.g., to simultaneously scan overlapping portions of the respective FOVs of the two LIDARs at the particular reference_time despite a difference between the physical mounting positions of the two LIDARs, etc.).

In some implementations, method 800 may also involve determining a difference between the target pointing direction and a measured pointing direction of the LIDAR device (e.g., measured using indicator(s) 714). For example, a system of method 800 may perform the computation shown in equation [4] below.

$$\text{phase\_error} = \text{AngleWrapper}(\text{target\_direction} - \text{measured\_direction}) \quad [4]$$

where phase_error is a difference between the phase of the rotation of the LIDAR device about the axis and a target phase (based on the common timing signal), AngleWrapper is a function that transforms the difference between the two phases to a value between −180° and +180°, and the measured_direction is the measured position of the LIDAR device about a rotation axis thereof (e.g., axis 519).

In some implementations, method 800 may also involve modulating power provided to an actuator that rotates the LIDAR device based on: (i) a difference between the target pointing direction and the measured pointing direction, and/or (ii) a difference between the target rate of change (or target_frequency of rotation) and the measured rate of change (or measured_frequency of rotation). For example, a system of method 800 may perform the computations in equations [5] and [6] below.

$$\text{combined\_error} = \text{frequency\_error} + \text{phase\_gain\_coefficient} \cdot \text{phase\_error} \qquad [5]$$

$$\text{motor\_drive\_signal} = \text{MotorCon}(\text{combined\_error}) \qquad [6]$$

where combined_error is a weighted sum of the frequency_error of equation [2] and the phase_error of equation [4] (weighted by the phase_gain_coefficient). To that end, the phase_gain_coefficient may be any value that can be used to smooth variations in the phase_error due to, for example, measurement errors by the indicator(s) 714 among other possibilities. Further, motor_drive_signal may be a modulated signal provided by a controller (e.g., controller 720) to power an actuator (e.g., actuator 712) according to a configuration of a motor controller (e.g. PID controller, etc.) indicated by the function MotorCon. Thus, for example, MotorCon may be any motor controller configuration (e.g., PID controller interface, etc.) that computes a voltage or current (e.g., modulated power signal, etc.) to apply to actuator 712 based on the combined_error signal.

In some implementations, method 800 may also involve modulating the power provided to the actuator based on the frequency_error (e.g., difference between target frequency of rotation and measured frequency of rotation of LIDAR) when the frequency_error is above a threshold (e.g., adjust frequency difference first), and then modulate the power provided to the actuator based on the frequency_error and the phase_error (e.g., difference between target pointing direction of LIDAR and measured pointing direction) when the frequency_error is below the threshold. For example, by doing so, the system of method 800 may improve the transient time to achieve the target frequency of rotation (which may be less susceptible to measurement errors in the measured frequency of rotation), and then add the phase_error (together with the phase_gain_coefficient) into the combined_error signal to achieve a target phase (which may need more time due to noise in the measured position of the LIDAR device, etc.) as well.

In practice, for instance, measured_frequency may be less noisy than measured_position. Thus, improved performance may be achieved by obtaining and correcting for the difference between target_frequency (or adjusted_target_frequency) and measured_frequency first (at least within the threshold), then correcting for the difference between target_direction and measured_direction.

It is noted that implementations described above in connection with equations [1]-[6] are exemplary only. Other implementations are possible as well.

In some implementations, method 800 involves generating a point cloud representation of an environment based on a first scan of the first FOV by the first LIDAR device and a second scan of the second FOV by the second LIDAR device. Referring back to FIG. 5E for example, the first LIDAR device can scan the first FOV (between contours 548 and 549) and the second LIDAR device can scan the second FOV (contour 591) simultaneously (i.e., during a same scan period). Referring now to FIG. 4, computer system 410 of vehicle 400 can then process the first and second scans to generate a combined point cloud representation.

Thus, in some examples, the first scan may be based on first sensor data collected by the first LIDAR device during a particular time period, and the second sensor data may be based on second sensor data collected by the second LIDAR device during the (same) particular time period. In this way, for instance, a system of method 800 can update the point cloud representation periodically for each periodic scan period (e.g., 10 Hz, etc.) in which the first LIDAR device and second LIDAR device simultaneously and repeatedly scan the first FOV and the second FOV.

In some implementations, method 800 involves displaying a three-dimensional (3D) representation of an environment of a vehicle based on a first scan of the first FOV by the first LIDAR device and a second scan of the second FOV by the second LIDAR device. For example, vehicle 400 can operate display 454 to render the 3D representation (e.g., point cloud representation that is computed based on the first scan and the second scan, etc.) for display to a user of vehicle 400.

In some examples, the 3D representation is indicative of first sensor data collected by the first LIDAR device during a first complete rotation of the first LIDAR device about a first yaw axis, and indicative of second sensor data collected by the second LIDAR device during a second complete rotation of the second LIDAR device about a second yaw axis.

In a first example, the first LIDAR device may be configured to obtain a single scan of the first FOV during the first complete rotation, and the second LIDAR device may be configured to obtain a single scan of the second FOV during the second complete rotation. Further, the two LIDAR devices can be rotated synchronously in line with the discussion at block 806 to temporally and spatially synchronize sensor data collected in the overlapping portion of the first and second FOVs.

Alternatively, in a second example, the second LIDAR device may be configured to obtain multiple scans of the second FOV during the second complete rotation of the second LIDAR device. Referring back to FIG. 2C for instance, LIDAR 200 could obtain two scans of the same FOV simultaneously during a single rotation of LIDAR 200 (about axis 219 shown in FIG. 2B). Thus, in this example, a system of method 800 may combine two scans of the second FOV by the second LIDAR (e.g., LIDAR 200) with a single scan of the first FOV by the first LIDAR (e.g., LIDAR 300). For instance, the two LIDARs can be rotated synchronously (e.g., at a same rate of rotation), and the combined 3D representation can for updated after each complete rotation by both LIDARs to incorporate sensor data from a single scan by the first LIDAR with sensor data from two scans by the second LIDAR. In this way, the horizontal resolution (e.g., point cloud density) of the portion of the combined 3D representation associated with the second FOV can be increased.

More generally, in some examples, a system of method 800 can synchronize the adjustment of the first pointing direction and the second pointing directions such that each LIDAR device completes one or more scans of its FOV during a particular time period. In this way, a combined point cloud representation of the environment can be updated periodically using a complete set of data points from each scan (rather than an incomplete dataset if one of the LIDARs does not complete scanning its entire FOV during the particular time period).

Accordingly, in some implementations, the synchronous adjustment at block 806 may involve causing the first LIDAR device to obtain one or more complete scans of the first FOV during a particular time period, and causing the second LIDAR device to obtain one or more complete scans of the second FOV during the particular time period.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed:

1. A system comprising:
   a first light detection and ranging (LIDAR) device mounted to a vehicle at a first mounting position, wherein the first LIDAR device scans a first field-of-view (FOV) defined by a first range of yaw directions of the first LIDAR device and the first mounting position, wherein the first FOV extends a first distance from the vehicle;
   a second LIDAR device mounted to the vehicle at a second mounting position, wherein the second LIDAR device scans a second FOV defined by a second range of yaw directions of the second LIDAR device and the second mounting position, wherein the second FOV at least partially overlaps the first FOV, wherein the second FOV extends a second distance from the vehicle, and wherein the first distance is greater than the second distance;
   a first LIDAR controller, wherein the first LIDAR controller operates a first actuator to rotate the first LIDAR device to adjust a first yaw direction of the first LIDAR device; and
   a second LIDAR controller, wherein the second LIDAR controller operates a second actuator to rotate the second LIDAR device synchronously with the rotation of the first LIDAR device to adjust a second yaw direction of the second LIDAR device.

2. The system of claim 1, further comprising:
   a system controller, wherein the system controller generates a point cloud representation of an environment based on a first scan of the first FOV by the first LIDAR device and a second scan of the second FOV by the second LIDAR device.

3. The system of claim 2, wherein the first scan is based on first sensor data collected by the first LIDAR device during a particular time period, and wherein the second scan is based on second sensor data collected by the second LIDAR device during the particular time period.

4. The system of claim 1, comprising wherein:
   the first actuator is configured to rotate the first LIDAR device about a first axis; and
   the second actuator is configured to rotate the second LIDAR device about a second axis, wherein the second axis is substantially parallel to the first axis.

5. The system of claim 1, wherein the first LIDAR controller is configured to operate the first actuator to align the first yaw direction of the first LIDAR device with a target object in the environment at a particular time, and
   wherein the second LIDAR controller is configured to operate the second actuator to align the second yaw direction of the second LIDAR device with the target object at the particular time.

6. The system of claim 1, wherein the first LIDAR controller operates the first actuator to rotate the first LIDAR device based on a reference timing signal, and
   wherein the second LIDAR controller operates the second actuator to rotate the second LIDAR device based also on the reference timing signal.

7. The system of claim 6, wherein the first LIDAR controller generates the reference timing signal, and wherein the first LIDAR controller transmits an indication of the reference timing signal for receipt by the second LIDAR controller.

8. The system of claim 6, further comprising:
   a system controller that generates the reference timing signal and provides an indication of the reference timing signal to the first LIDAR controller and the second LIDAR controller.

9. A vehicle comprising:
   a first light detection and ranging (LIDAR) device mounted to the vehicle at a first mounting position, wherein the first LIDAR device scans a first field-of-view (FOV) associated with a first range of yaw directions of the first LIDAR device, wherein the first FOV extends a first distance from the vehicle;
   a second LIDAR device mounted to the vehicle at a second mounting position, wherein the second LIDAR device scans a second FOV associated with a second range of yaw directions of the second LIDAR device, and wherein the second FOV at least partially overlaps the first FOV, wherein the second FOV extends a second distance from the vehicle, and wherein the first distance is greater than the second distance;
   a first actuator that rotates the first LIDAR device to adjust a first yaw direction of the first LIDAR device; and
   a second actuator that rotates the second LIDAR device synchronously with the rotation of the first LIDAR device to adjust a second yaw direction of the second LIDAR device.

10. The vehicle of claim 9, wherein the first actuator rotates the first LIDAR device about a first yaw axis, and wherein the second actuator rotates the second LIDAR device about a second yaw axis that is substantially parallel to the first yaw axis.

11. The vehicle of claim 9, wherein the first LIDAR device is mounted on a top side of the vehicle, and wherein the second LIDAR is mounted on a front side of the vehicle.

12. The vehicle of claim 9, further comprising:
    a controller that causes the first actuator to rotate the first LIDAR device according to a reference timing signal, and
    wherein the controller causes the second actuator to rotate the second LIDAR device according to the reference timing signal, the first mounting position, and the second mounting position.

13. The vehicle of claim 9, further comprising:
    a display, wherein the display displays a three-dimensional (3D) representation of an environment of the vehicle based on a first scan of the first FOV by the first LIDAR device and a second scan of the second FOV by the second LIDAR device.

14. The vehicle of claim 13, wherein the 3D representation is indicative of first sensor data collected by the first LIDAR device during a first complete rotation of the first LIDAR device about a first yaw axis, and wherein the 3D representation is indicative of second sensor data collected by the second LIDAR device during a second complete rotation of the second LIDAR device about a second yaw axis.

15. A method comprising:
scanning a first field-of-view (FOV) defined by a first range of yaw directions of a first light detection and ranging (LIDAR) device and a first mounting position of the first LIDAR device on a vehicle, wherein the first FOV extends a first distance from the vehicle;
scanning a second FOV defined by a second range of yaw directions of a second LIDAR device and a second mounting position of the second LIDAR device on the vehicle, wherein the second FOV at least partially overlaps the first FOV, wherein the second FOV extends a second distance from the vehicle, and wherein the first distance is greater than the second distance;
rotating the first LIDAR device to adjust a first yaw direction of the first LIDAR device; and
rotating the second LIDAR device synchronously with the rotation of the first LIDAR device to adjust a second yaw direction of the second LIDAR device.

16. The method of claim 15, wherein rotating the second LIDAR device synchronously with the rotation of the first LIDAR device comprises:
rotating the first LIDAR device about a first axis and the second LIDAR device about a second axis; and
synchronizing one or more rotation characteristics of the first LIDAR device with one or more corresponding rotation characteristics of the second LIDAR device.

17. The method of claim 16, wherein the one or more rotation characteristics of the first LIDAR device include at least one of a phase of the rotation of the first LIDAR device, a rate of the rotation of the first LIDAR device, a direction of the rotation of the first LIDAR device, or the first axis of the rotation of the first LIDAR device.

18. The method of claim 17, wherein synchronizing the one or more rotational characteristics is based on a reference timing signal.

19. The system of claim 1, wherein the first LIDAR device is mounted on a top side of the vehicle, and wherein the second LIDAR is mounted on a front side of the vehicle.

20. The method of claim 15, wherein the first LIDAR device is mounted on a top side of the vehicle, and wherein the second LIDAR is mounted on a front side of the vehicle.

* * * * *